US012187016B2

(12) United States Patent
Alaboson et al.

(10) Patent No.: US 12,187,016 B2
(45) Date of Patent: *Jan. 7, 2025

(54) MULTILAYER FILMS HAVING AT LEAST THREE LAYERS AND METHODS OF PRODUCING THE SAME

(71) Applicant: Dow Global Technologies LLC, Midland, MI (US)

(72) Inventors: Justice Alaboson, Freeport, TX (US); Sanjib Biswas, Lake Jackson, TX (US); Joshua B. Gaubert, Lake Jackson, TX (US); Douglas S. Ginger, Lake Jackson, TX (US); Vivek Kalihari, Freeport, TX (US); Mridula Kapur, Lake Jackson, TX (US); Lori L. Kardos, Freeport, TX (US); Nicolas Cardoso Mazzola, Sao Paulo (BR); Francis O. Olajide, Jr., Freeport, TX (US); Didem Oner-Deliormanli, Freeport, TX (US); Jose Eduardo Ruiz, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 348 days.

This patent is subject to a terminal disclaimer.

(21) Appl. No.: 17/632,604

(22) PCT Filed: Aug. 4, 2020

(86) PCT No.: PCT/US2020/044856
§ 371 (c)(1),
(2) Date: Feb. 3, 2022

(87) PCT Pub. No.: WO2021/026134
PCT Pub. Date: Feb. 11, 2021

(65) Prior Publication Data
US 2022/0288906 A1 Sep. 15, 2022

Related U.S. Application Data

(60) Provisional application No. 62/883,469, filed on Aug. 6, 2019, provisional application No. 62/883,467, filed on Aug. 6, 2019.

(51) Int. Cl.
*B32B 27/32* (2006.01)
*B32B 27/08* (2006.01)
*C08L 23/06* (2006.01)

(52) U.S. Cl.
CPC .............. *B32B 27/32* (2013.01); *B32B 27/08* (2013.01); *C08L 23/06* (2013.01);
(Continued)

(58) Field of Classification Search
None
See application file for complete search history.

(56) References Cited

U.S. PATENT DOCUMENTS 3,003,000 A  10/1961  Milas et al.
3,645,922 A   2/1972  Elston et al.
(Continued)

FOREIGN PATENT DOCUMENTS

CA   2897575 A1   7/2014
EP   1935909 A1   6/2008
(Continued)

OTHER PUBLICATIONS

Indonesian Notification and Examination Report, dated Aug. 9, 2023, pertaining to Indonesian Patent Application No. P00202201478, 5 pgs.
(Continued)

*Primary Examiner* — Ramsey Zacharia
(74) *Attorney, Agent, or Firm* — Dinsmore & Shohl LLP

(57) ABSTRACT

Embodiments of the present disclosure are directed to multilayer films. Embodiments of the multilayer films may
(Continued)

include a first layer comprising a polyethylene composition having a density of 0.924 g/cm³ to 0.936 g/cm³ and a melt index ($I_2$) of 0.25 g/10 minutes to 2.0 g/10 minutes, a second layer comprising a first polyolefin, a third layer comprising a second polyolefin. The first layer may be positioned between the second layer and the third layer. The first polyolefin and the second polyolefin may be the same or different.

15 Claims, 3 Drawing Sheets

(52) U.S. Cl.
CPC ....... *B32B 2250/03* (2013.01); *B32B 2307/72* (2013.01); *B32B 2307/732* (2013.01); *C08L 2203/16* (2013.01); *C08L 2207/066* (2013.01)

(56) References Cited

U.S. PATENT DOCUMENTS

| | | | |
|---|---|---|---|
| 3,914,342 | A | 10/1975 | Mitchell |
| 4,076,698 | A | 2/1978 | Anderson et al. |
| 4,599,392 | A | 7/1986 | McKinney et al. |
| 5,272,236 | A | 12/1993 | Lai et al. |
| 5,278,272 | A | 1/1994 | Lai et al. |
| 5,582,923 | A | 12/1996 | Kale et al. |
| 5,733,155 | A | 3/1998 | Sagawa |
| 5,854,045 | A | 12/1998 | Fang et al. |
| 6,306,969 | B1 | 10/2001 | Patel et al. |
| 6,582,828 | B1 | 6/2003 | Kaschel |
| 6,586,061 | B1 | 7/2003 | Sasaki et al. |
| 9,242,431 | B2 | 1/2016 | Cruz et al. |
| 9,505,508 | B2 | 11/2016 | Berbert |
| 9,631,059 | B2 | 4/2017 | Demirors et al. |
| 9,688,795 | B2 | 6/2017 | Cerk et al. |
| 2002/0065370 | A1 | 5/2002 | Chikanari et al. |
| 2004/0241483 | A1 | 12/2004 | Farley et al. |
| 2010/0099824 | A1 | 4/2010 | Helland et al. |
| 2012/0100356 | A1 | 4/2012 | Ohlsson et al. |
| 2014/0134302 | A1 | 5/2014 | Hodge |
| 2014/0255674 | A1 | 9/2014 | Tice et al. |
| 2015/0360450 | A1 | 12/2015 | Barbaroux et al. |
| 2018/0046104 | A1 | 2/2018 | Fukatsu et al. |
| 2018/0051704 | A1 | 2/2018 | Kihara et al. |
| 2018/0155474 | A1 | 6/2018 | Holtcamp et al. |
| 2018/0170015 | A1 | 6/2018 | Solis et al. |
| 2018/0370201 | A1* | 12/2018 | Farkas .................... B65B 3/045 |
| 2019/0100644 | A1 | 4/2019 | Williamson et al. |
| 2019/0135959 | A1 | 5/2019 | Kazemi et al. |
| 2019/0225786 | A1 | 7/2019 | Yang et al. |
| 2020/0239673 | A1 | 7/2020 | Ssubramaniam et al. |

FOREIGN PATENT DOCUMENTS

| | | | |
|---|---|---|---|
| EP | 1961558 | A1 | 8/2008 |
| EP | 2177548 | A1 | 4/2010 |
| EP | 2348057 | A1 | 7/2011 |
| EP | 2653392 | B1 | 10/2015 |
| EP | 2106421 | B2 | 6/2016 |
| EP | 3772415 | B1 | 12/2022 |
| EP | 4010191 | B1 | 7/2023 |
| JP | 2015074197 | A | 4/2015 |
| JP | 2016051398 | A | 4/2016 |
| JP | 2017061123 | A | 3/2017 |
| WO | 199947601 | | 9/1999 |
| WO | 2005023912 | A2 | 3/2005 |
| WO | 2005111291 | A1 | 11/2005 |
| WO | 2007045415 | A1 | 4/2007 |
| WO | 2007095667 | A1 | 8/2007 |
| WO | 2008089978 | A1 | 7/2008 |
| WO | 2008124557 | A1 | 10/2008 |
| WO | 2010034463 | A1 | 4/2010 |
| WO | 2010047709 | A1 | 4/2010 |
| WO | 2011019563 | A1 | 2/2011 |
| WO | 2012003042 | A1 | 1/2012 |
| WO | 2013087531 | A1 | 6/2013 |
| WO | 2014051682 | A1 | 4/2014 |
| WO | 2015200743 | A1 | 12/2015 |
| WO | 2016025168 | A1 | 2/2016 |
| WO | 2016145550 | A1 | 9/2016 |
| WO | 2016196168 | A1 | 12/2016 |
| WO | 2017040127 | A1 | 3/2017 |
| WO | 2017097573 | A1 | 6/2017 |
| WO | 2017155609 | A1 | 9/2017 |
| WO | 2017172273 | A1 | 10/2017 |
| WO | 2018002196 | A1 | 1/2018 |
| WO | 2018106480 | A1 | 6/2018 |
| WO | 2018172510 | A1 | 9/2018 |
| WO | 2019070440 | A1 | 4/2019 |
| WO | 2019133373 | A1 | 7/2019 |

OTHER PUBLICATIONS

Indonesian Office Action dated Sep. 5, 2023, pertaining to ID Patent Application No. P00202201543, 6 pgs.
Brazil Office Action dated Oct. 6, 2023, pertaining to BR Patent Application No. BR112022001974.2, 8 pgs.
Brazil Office Action dated Oct. 23, 2023, pertaining to BR Patent Application No. BR112022002023.6, 8 pgs.
Brazil Office Action dated Oct. 23, 2023, pertaining to BR Patent Application No. BR112022001979.3, 8 pgs.
Brazil Office Action dated Oct. 23, 2023, pertaining to BR Patent Application No. BR112022002086.4, 8 pgs.
US Office Action dated Nov. 29, 2023, pertaining to U.S. Appl. No. 17/632,706, 7 pgs.
India Examination Report dated Dec. 22, 2023, pertaining to IN Patent Application No. 202217005875, 7 pgs.
U.S. Notice of Allowance dated Jan. 4, 2024, pertaining to U.S. Appl. No. 17/632,468, 9 pgs.
International Search Report and Written Opinion dated Oct. 8, 2020, pertaining to Int'l Appl. No. PCT/US2020/044856 filed Aug. 4, 2020, 13 pgs.
International Search Report and Written Opinion dated Oct. 15, 2020, pertaining to Int'l Appl. No. PCT/US2020/044857 filed Aug. 4, 2020, 13 pgs.
International Search Report and Written Opinion dated Oct. 12, 2020, pertaining to Int'l Appl. No. PCT/US2020/044862 filed Aug. 4, 2020, 13 pgs.
International Search Report and Written Opinion dated Oct. 13, 2020, pertaining to Int'l Appl. No. PCT/US2020/044860 filed Aug. 4, 2020, 13 pgs.
International Search Report and Written Opinion dated Oct. 8, 2020, pertaining to Int'l Appl. No. PCT/US2020/044863 filed Aug. 4, 2020, 13 pgs.
International Search Report and Written Opinion dated Oct. 14, 2020, pertaining to Int'l Appl. No. PCT/US2020/044864 filed Aug. 4, 2020, 13 pgs.
161/162 Communication dated Mar. 15, 2022, pertaining to EP Patent Application No. 20761662.4, 3 pgs.
International Preliminary Report on Patentability dated Feb. 8, 2022, pertaining to EP Patent Application No. 20761662.4, 6 pgs.
161/162 Communication dated Mar. 15, 2022, pertaining to EP Patent Application No. 20758398.0, 3 pgs.
International Preliminary Report on Patentability dated Feb. 8, 2022, pertaining to EP Patent Application No. 20758398.0, 6 pgs.
Non-Final Office Action dated Apr. 4, 2022, pertaining to U.S. Appl. No. 16/984,765, 11 pgs.
Milas et al., "Studies in Organic Peroxides XXV Preparation, Separation and Identification of Peroxides Derived from Methyl Ethyl Ketone and Hydrogen Peroxide," A., J. Am. Chem. Soc, vol. 81, pp. 5824-5826 (1959).
US Notice of Allowance dated Mar. 19, 2024, pertaining to U.S. Appl. No. 17/632,706, 7 pgs.
Japanese Office Acton dated Mar. 26, 2024, pertaining to JP Patent Application No. 2022-503406, 6 pgs.

(56) References Cited

OTHER PUBLICATIONS

Argentine Substantive Examination dated Apr. 22, 2024, pertaining to AR Patent Application No. 20200102228, 2 pgs.
Japanese Office Action dated Apr. 16, 2024, pertaining to JP Patent Application No. 2022-503809, 13 pgs.
Japanese Office Action dated Jun. 4, 2024, pertaining to JP Patent Application No. 2022-504497, 12 pgs.
Japanese Office Action dated Aug. 27, 2024, pertaining to JP Patent Application No. 2022-506883, 10 pgs.
US Office Action dated Sep. 18, 2024, pertaining to U.S. Appl. No. 17/632,706, 5 pgs.

* cited by examiner

MULTILAYER FILMS HAVING AT LEAST THREE LAYERS AND METHODS OF PRODUCING THE SAME

CROSS REFERENCE TO RELATED APPLICATIONS

This application is a National Stage Entry under 35 U.S.C. § 371 of International Patent Application No. PCT/US2020/044856, filed Aug. 4, 2020, which claims priority to U.S. Provisional Patent Application No. 62/883,469, filed on Aug. 6, 2019, and U.S. Provisional Patent Application No. 62/883,467, filed Aug. 6, 2019, the entire disclosures of which are hereby incorporated by reference.

TECHNICAL FIELD

Embodiments described herein generally relate to multilayer films and specifically relate to multilayer films including polyethylene.

BACKGROUND

Improved sustainability is a goal for manufacturers of multilayer films that include polyethylene. It is therefore beneficial for monolayer and multilayer polymer films, which may include blown or cast films, to demonstrate toughness while allowing for a reduction of material costs, for example, from down-gauging (i.e., using thinner film thicknesses), or reducing or eliminating relatively expensive materials, such as polyamides.

SUMMARY

In conventional multilayer films, the inclusion of a polyamide core layer in multilayer film structures may present a desirable balance of film properties between dart and film modulus. However, the incorporation of the polyamide core layer may increase process complexity, increase film structure complexity, produce non-recyclable multilayer films, and increase material costs. However, typically, without incorporating a polyamide core layer, attempts to improve the modulus by film modification may result in the loss of dart while the attempts to improve the dart typically results in the loss of modulus. Additionally, obtaining polymer films which have sufficient toughness while allowing for a reduction of material costs through down-gauging is often challenging.

Therefore, there are needs for multilayer films that exhibit physical properties, such as dart/bag drop, puncture, tear, and creep resistance, that meet customer and industry requirements. In some embodiments, these multilayer films may still maintain physical properties that meet customer and industry requirements even at reduced thicknesses or even without a polyamide core layer.

Embodiments of the present disclosure meet those needs, in various embodiments, by providing multilayer films including at least three layers that provide a balance of stiffness and abuse properties (e.g. dart, puncture energy, tear). Such multilayer films may include a polyethylene composition in a core layer, which exhibits an improved balance of toughness and creep resistance. Moreover, when reducing the overall thickness of the multilayer including a polyethylene composition in a core layer, the multilayer film may still exhibit an improved balance of toughness and creep resistance when compared to conventional multilayer films.

According to at least one embodiment, a multilayer film is provided. Embodiments of the multilayer film may include a first layer comprising a polyethylene composition, a second layer comprising a first polyolefin, and a third layer comprising a second polyolefin. The first layer may be positioned between the second layer and the third layer. The first polyolefin and the second polyolefin are the same or different in composition. The polyethylene composition may include (a) a first polyethylene fraction having a single peak in a temperature range of 45° C. to 87° C. in an elution profile via improved comonomer composition distribution (iCCD) analysis method, wherein a first polyethylene fraction area is an area in the elution profile beneath the single peak of the first polyethylene fraction between 45° C. and 87° C.; and (b) a second polyethylene fraction having a single peak in a temperature range of 95° C. to 120° C. in the elution profile via iCCD analysis method and wherein a second polyethylene fraction area is an area in the elution profile beneath the single peak of the second polyethylene fraction between 95° C. and 120° C.; wherein the polyethylene composition has a density of 0.924 g/cm$^3$ to 0.936 g/cm$^3$ and a melt index ($I_2$) of 0.25 g/10 minutes to 2.0 g/10 minutes, wherein the first polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.

According to at least another embodiment, a multilayer film is provided. Embodiments of the multilayer film may include a first layer, a second layer comprising a first linear low density polyethylene having a density of from 0.910 to 0.936 g/cm$^3$, and a third layer comprising a second linear low density polyethylene having a density of from 0.910 to 0.936 g/cm$^3$. The first linear low density polyethylene and the second linear low density polyethylene are the same or different in composition. The first layer may be positioned between the second layer and the third layer. The first layer may include from 10 wt. % to 80 wt. % of the total weight of the multilayer film. The first layer may include a polyethylene composition. The polyethylene composition may include (a) a first polyethylene fraction having a single peak in a temperature range of 45° C. to 87° C. in an elution profile via improved comonomer composition distribution (iCCD) analysis method, wherein a first polyethylene fraction area is an area in the elution profile beneath the single peak of the first polyethylene fraction between 45° C. and 87° C.; and (b) a second polyethylene fraction having a single peak in a temperature range of 95° C. to 120° C. in the elution profile via iCCD analysis method and wherein a second polyethylene area fraction area is an area in the elution profile beneath the single peak of the second polyethylene fraction between 95° C. and 120° C.; wherein the polyethylene composition has a density of 0.924 g/cm$^3$ to 0.936 g/cm$^3$ and a melt index (12) of 0.25 g/10 minutes to 2.0 g/10 minutes, wherein the first polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.

According to at least another embodiment, a multilayer film is provided. Embodiments of the multilayer film may include a first layer, a second layer, and a third layer. The first layer may be positioned between the second layer and the third layer. The first layer may include a high-density polyethylene composition having a density of from 0.940 g/cm$^3$ to 0.970 g/cm$^3$ when measured according to ASTM 742 and a polyethylene composition. The second layer may include at least 50 wt. % of a first linear low density polyethylene based on the total weight of the second layer, the first linear low density polyethylene having a density of from 0.910 g/cm³ to 0.936 g/cm³. The third layer may include at least 50 wt. % of a second linear low density polyethylene based on the total weight of the second layer, the second linear low density polyethylene having a density of from 0.910 g/cm³ to 0.936 g/cm³. The first linear low density polyethylene and the second linear low density polyethylene may be the same or different in composition. The polyethylene composition may include (a) a first polyethylene fraction having a single peak in a temperature range of 45° C. to 87° C. in an elution profile via improved comonomer composition distribution (iCCD) analysis method, wherein a first polyethylene fraction area is an area in the elution profile beneath the single peak of the first polyethylene fraction between 45° C. and 87° C.; and (b) a second polyethylene fraction having a single peak in a temperature range of 95° C. to 120° C. in the elution profile via iCCD analysis method and wherein a second polyethylene fraction area is an area in the elution profile beneath the single peak of the second polyethylene fraction between 95° C. and 120° C.; wherein the polyethylene composition has a density of 0.924 g/cm³ to 0.936 g/cm³ and a melt index ($I_2$) of 0.25 g/10 minutes to 2.0 g/10 minutes, wherein the first polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.

According to at least another embodiment, a multilayer film is provided. Embodiments of the multilayer film may include a first layer, a second layer, and a third layer. The first layer may be positioned between the second layer and the third layer. The first layer may include a first polyethylene having a density of from 0.940 g/cm³ to 0.970 g/cm³ and a first polyethylene composition having a density of 0.924 g/cm³ to 0.936 g/cm³. The second layer may include a second polyethylene having a density of 0.940 g/cm³ to 0.970 g/cm³, a first low density polyethylene composition having a density of 0.916 g/cm³ to 0.935 g/cm³, and a second polyethylene composition having a density of 0.924 g/cm³ to 0.936 g/cm³. The third layer may include a second low density polyethylene composition having a density of 0.916 g/cm³ to 0.935 g/cm³ and a third polyethylene composition having a density of 0.924 g/cm³ to 0.936 g/cm³. The first polyethylene and the second polyethylene may be the same or different in composition. The first low density polyethylene and the second low density polyethylene may be the same or different in composition. The first polyethylene composition, second polyethylene composition, and the third polyethylene composition may be the same or different compositions and each may include (a) a first polyethylene fraction having a single peak in a temperature range of 45° C. to 87° C. in an elution profile via improved comonomer composition distribution (iCCD) analysis method, wherein a first polyethylene fraction area is an area in the elution profile beneath the single peak of the first polyethylene fraction between 45° C. and 87° C.; and (b) a second polyethylene fraction having a single peak in a temperature range of 95° C. to 120° C. in the elution profile via iCCD analysis method and wherein a second polyethylene fraction area is an area in the elution profile beneath the single peak of the second polyethylene fraction between 95° C. and 120° C.; wherein the polyethylene composition has a density of 0.924 g/cm³ to 0.936 g/cm³ and a melt index ($I_2$) of 0.25 g/10 minutes to 2.0 g/10 minutes, wherein the first polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.

These and other embodiments are described in more detail in the following Detailed Description in conjunction with the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
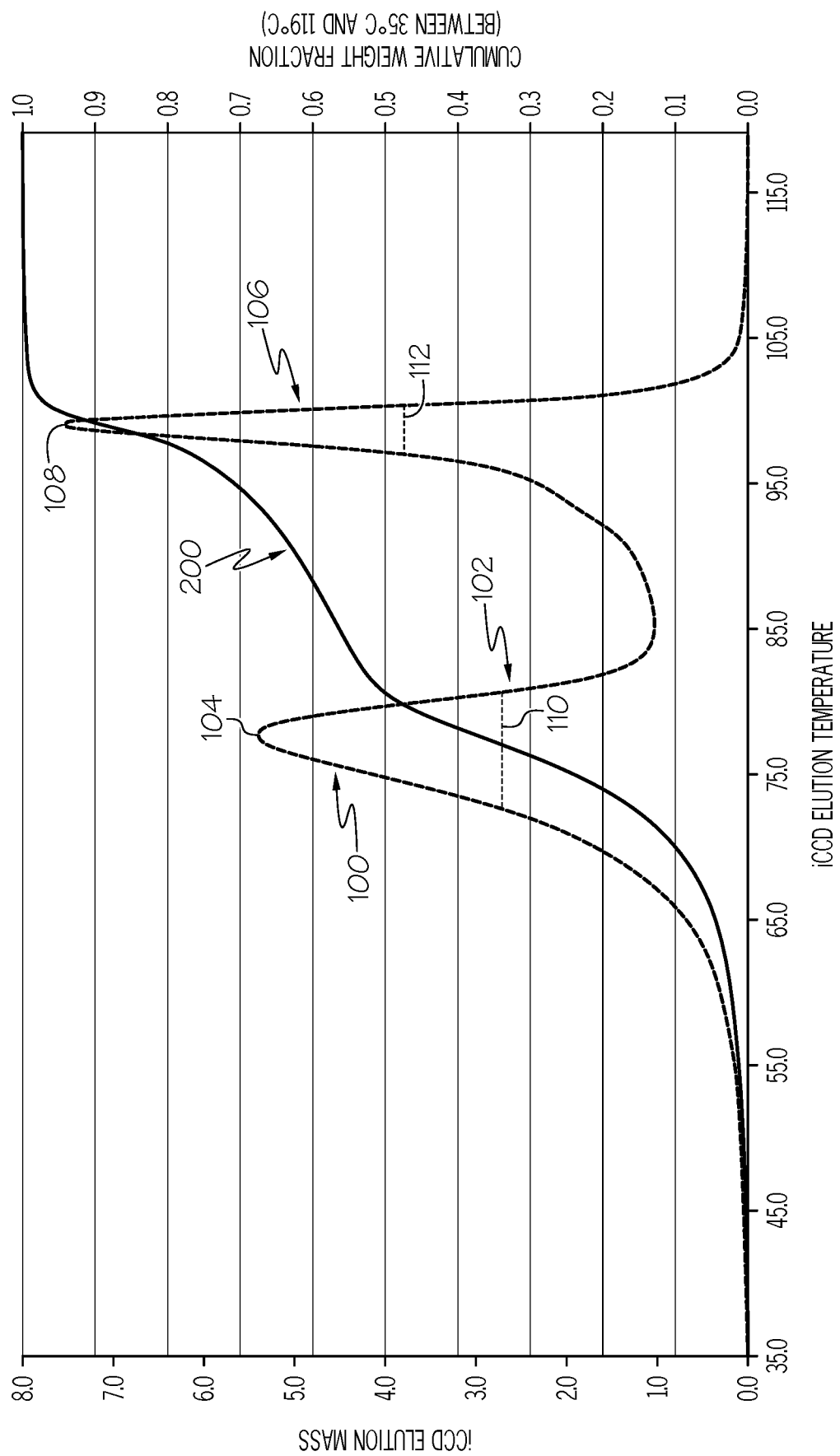
FIG. 1 schematically depicts an iCCD elution profile, according to one or more embodiments presently described.

Specific embodiments of the present application will now be described. These embodiments are provided so that this disclosure will be thorough and complete and will fully convey the scope of the claimed subject matter to those skilled in the art.

Unless stated to the contrary, implicit from the context, or customary in the art, all parts and percent values are based on weight, all temperatures are in ° C., and all test methods are current as of the filing date of this disclosure.

The term "polymer" refers to a polymeric compound prepared by polymerizing monomers, whether of a same or a different type. The generic term polymer thus embraces the term "homopolymer," which usually refers to a polymer prepared from only one type of monomer as well as "copolymer," which refers to a polymer prepared from two or more different monomers. The term "interpolymer," as used herein, refers to a polymer prepared by the polymerization of at least two different types of monomers. The generic term interpolymer thus includes a copolymer or polymer prepared from more than two different types of monomers, such as terpolymers.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of ethylene-based polymers known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "composition," as used herein, refers to a mixture of materials which comprises the composition, as well as reaction products and decomposition products formed from the materials of the composition.

"Polypropylene" or "propylene-based polymer" as used herein, refers to a polymer that comprises, in polymerized form, refers to polymers comprising greater than 50% by mole of units which have been derived from propylene monomer. This includes propylene homopolymer, random copolymer polypropylene, impact copolymer polypropylene, propylene/α-olefin copolymer, and propylene/α-olefin copolymer.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392, which is hereby incorporated by reference). LDPE resins typically have a density in the range of 0.916 $g/cm^3$ to 0.940 $g/cm^3$.

The term "LLDPE," includes resin made using Ziegler-Natta catalyst systems as well as resin made using single-site catalysts, including, but not limited to, bis-metallocene catalysts (sometimes referred to as "m-LLDPE"), phosphinimine, and constrained geometry catalysts, and resins made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. No. 5,272,236, U.S. Pat. No. 5,278,272, U.S. Pat. No. 5,582,923 and U.S. Pat. No. 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. No. 3,914,342 and U.S. Pat. No. 5,854,045). The LLDPE resins can be made via gas-phase, solution-phase, or slurry polymerization or any combination thereof, using any type of reactor or reactor configuration known in the art.

The term "MDPE" refers to polyethylenes having densities from 0.924 $g/cm^3$ to 0.942 $g/cm^3$. "MDPE" is typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts and polyvalent aryloxyether catalysts (typically referred to as bisphenyl phenoxy).

The term "HDPE" refers to polyethylenes having densities greater than about 0.935 $g/cm^3$ and up to about 0.980 $g/cm^3$, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 $g/cm^3$ to 0.912 $g/cm^3$, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers. Polyethylene (ethylene-based) elastomers plastomers generally have densities of 0.855 $g/cm^3$ to 0.912 $g/cm^3$.

"Blend," "polymer blend," and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

"Multilayer structure" or "multilayer film" means any structure having more than one layer. For example, the multilayer structure (for example, a film) may have two, three, four, five, or more layers. A multilayer structure may be described as having the layers designated with letters. For example, a three layer structure designated as A/B/C may have a core layer, B, and two external layers, A and C. Likewise, a structure having two core layers, B and C, and two external layers, A and D, would be designated A/B/C./D.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Multilayer Films

Reference will now be made to embodiments of the multilayer films described herein. Embodiments of the presently-described multilayer films may include at least three layers.

Multilayer films of the present disclosure may include at least three layers and even as many as 13 or more layers. The number of layers in the multilayer film may depend on a number of factors including, for example, the composition of each layer in the multilayer film, the desired properties of the multilayer film, the desired end-use application of the multilayer film, the manufacturing process of the multilayer film, and others. The multilayer film may be a three-layer structure designated as A/B/C, where the first layer may be designated as A, the second layer may be designated as B, and the third layer may be designated as C. In some embodiments, the first layer may be referred to as a "core layer." In some embodiments, one or both of the second layer and the third layer may be referred to as "skin layers" or "outer layers." In embodiments, the first layer may be positioned between the second layer and the third layer. In further embodiments, the second layer and the third layer may be the outermost layers of the multilayer film. As used herein, the outermost layers of the multilayer film may be understood to mean there may not be another layer deposited over the outermost layer, such that the outermost layer is in direct contact with the surrounding air.

In embodiments, the first layer and the second layer, the first layer and third layer, or both may be in direct contact with one another. As used herein, "direct contact" means that there may not be any other layers positioned between the two layers that are in direct contact with one another. In other embodiments, the multilayer film may include one or more additional layers, for example, one or more tie layers, which may be disposed between the first layer (the core layer) and the second layer (an outer layer), between the first layer (the core layer) and the third layer (another outer layer), or both.

As described in more detail subsequently in this disclosure, the multilayer films may include a first layer including a polyethylene composition, a second layer including a first polyolefin, and a second layer including a second polyolefin. The first polyolefin and the second polyolefin may be the same or different in composition. It should be understood that any of the foregoing layers can further comprise one or more additives as known to those of skill in the art such as, for example, plasticizers, stabilizers including viscosity stabilizers, hydrolytic stabilizers, primary and secondary antioxidants, ultraviolet light absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. Inorganic fillers, such as calcium carbonate, and the like can also be incorporated into one or more of the first layer, the second layer, the third layer, and combinations thereof. In some embodiments, the first layer, the second layer, the third layer, and combinations may each include up to 5 weight percent of such additional additives based on the total weight of the respective layer. All individual values and subranges from 0 wt. % to 5 wt. % are included and disclosed herein; for example, the total amount of additives in the first layer, the second layer, or the third layer can be from 0.5 wt. % to 5 wt. %, from 0.5 wt. % to 4 wt. %, from 0.5 wt. % to 3 wt. %, from 0.5 wt. % to 2 wt. %, from 0.5 wt. % to 1 wt. %, from 1 wt. % to 5 wt. %, from 1 wt. % to 4 wt. %, from 1 wt. % to 3 wt. %, from 1 wt. % to 2 wt. %, from 2 wt. % to 5 wt. %, from 2 wt. % to 4 wt. %, from 2 wt. % to 3 wt. %, from 3 wt. % to 5 wt. %, from 3 wt. % to 4 wt. %, or from 4 wt. % to 5 wt. % based on the total weight of the respective layer. The incorporation of the additives can be carried out by any known process such as, for example, by dry blending, by extruding a mixture of the various constituents, by the conventional masterbatch technique, or the like.

The multilayer films of the present disclosure can have a variety of thicknesses. The thickness of the multilayer film may depend on a number of factors including, for example, the number of layers in the multilayer film, the composition of the layers in the multilayer film, the desired properties of the multilayer film, the desired end-use application of the film, the manufacturing process of the multilayer film, and others. In embodiments the multilayer film may have a thickness of less than 500 micrometers (μm or microns). In other embodiments, the multilayer film may have a thickness of from 15 μm to 500 μm or 15 μm to 260 μm. In other embodiments, the multilayer film may have an overall thickness of from 15 μm to 200 μm, 15 μm to 150 μm, 15 μm, to 100 μm, from 15 μm to 50 μm, 50 μm to 500 μm, 50 μm to 260 μm, 50 μm to 200 μm, 50 μm to 150 μm, 50 μm to 100 μm, 100 μm to 500 μm from 100 μm to 260 μm, 100 μm to 200 μm, 100 μm to 150 μm, 150 μm to 500 μm, 150 μm to 260 μm, 150 μm, to 200 μm, 200 μm to 500 μm, 200 μm to 260 μm, or 260 μm to 500 μm.

The multilayer films of the present disclosure may have an overall density that depends on a number of factors including, for example, the number of layers in the multilayer film, the composition of the layers in the multilayer film, the desired properties of the multilayer film, the desired end-use application of the film, the manufacturing process of the multilayer film, and others. In embodiments, the multilayer film may have an overall density of at least 0.925 grams per cubic centimeter ($g/cm^3$). In other embodiments, the overall density of the multilayer film may be from 0.925 $g/cm^3$ to 0.960 $g/cm^3$, 0.925 $g/cm^3$ to 0.940 $g/cm^3$, from 0.925 $g/cm^3$ to 0.935 $g/cm^3$, from 0.925 $g/cm^3$ to 0.930 $g/cm^3$, from 0.930 $g/cm^3$ to 0.940 $g/cm^3$, from 0.930 $g/cm^3$ to 0.935 $g/cm^3$, or from 0.935 $g/cm^3$ to 0.940 $g/cm^3$.

The multilayer films of the present disclosure may have may have relatively good dart strength when measured according to ASTM D1709 Method A. In embodiments, the multilayer film may have a dart drop impact of at least 300 grams when measured according to ASTM D1709 Method A. In other embodiments, the multilayer film may have a dart drop impact of from 600 grams to 2000 grams, from 600 grams to 1500 grams, 600 grams to 1000 grams, from 700 grams to 2000 grams, from 700 grams to 1500 grams, 700 grams to 1000 grams, from 1000 grams to 2000 grams, from 1000 grams to 1500 grams, or from 1500 grams to 2000 grams when measured according to ASTM D1709 Method A. In further embodiments, the multilayer films of the present disclosure may have may have relatively good dart strength when measured according to ASTM D1709 Method B. In embodiments, the multilayer film may have a dart drop impact of at least 300 grams when measured according to ASTM D1709 Method B. In other embodiments, the multilayer film may have a dart drop impact of from 400 grams to 2000 grams, from 400 grams to 1500 grams, 400 grams to 1000 grams, from 700 grams to 2000 grams, from 700 grams to 1500 grams, 700 grams to 1000 grams, from 1000 grams to 2000 grams, from 1000 grams to 1500 grams, or from 1500 grams to 2000 grams when measured according to ASTM D1709 Method A.

The multilayer films of the present disclosure may have a tensile creep in a cross direction of less than 50%, when measured in accordance with ASTM 2990. In other embodiments, the multilayer film may have a tensile creep of less than 40% or less than 30%, when measured in accordance with ASTM 2990.

The multilayer films of the present disclosure may have a puncture energy at break of greater than 40 ft*lbf/$in^3$, when measured according to the test methods described subsequently in this disclosure. In other embodiments, the multilayer film may have a puncture energy at break of greater than 50 ft*lbf/$in^3$ or 60 ft*lbf/$in^3$, when measured according to the test methods described subsequently in this disclosure.

The multilayer films of the present disclosure may have an average secant modulus in a machine direction of at least 50,000 psi, when measured in accordance with ASTM D882. In other embodiments, the multilayer film may have an average secant modulus in a machine direction of at least 55,000 psi or 60,000 psi, when measured in accordance with ASTM D882. The multilayer films of the present disclosure may have an average secant modulus in a cross direction of at least 55,000 psi, when measured in accordance with ASTM D882. In other embodiments, the multilayer film may have an average secant modulus in a cross direction of at least 60,000 psi or 70,000 psi, when measured in accordance with ASTM D882.

Core Layer

As stated previously, the presently-disclosed multilayer films may include a core layer. In the multilayer film designated as three-layer structure, A/B/C, the core layer may be designated as B. In some embodiments, the core layer may be referred to as an "first layer." In further embodiments, the core layer may be in direct contact with one or both of the second layer and the third layer.

The core layer of the multilayer films of the present disclosure can have a variety of thicknesses. The thickness of the core layer may depend on a number of factors including, for example, the composition of the core layer, the desired overall properties of the multilayer film, the desired end-use application of the multilayer film, the manufacturing process of the multilayer film, and others. In embodiments, the core layer may have a thickness of from 0.5 micrometers (μm or microns) to 60 μm. In other embodiments, the second layer may have a thickness of from 0.5 μm to 50 μm, from 0.5 μm to 25 μm, from 0.5 μm to 10 μm, from 0.5 μm to 5 μm, from 0.5 μm to 1.0 μm, from 1.0 μm to 50 μm, from 1.0 μm to 25 μm, from 1.0 μm to 10 μm, from 1.0 μm to 5 μm, from 5 μm to 50 μm, from 5 μm to 25 μm, from 5 μm to 10 μm, from 10 μm to 50 μm, from 10 μm to 25 μm, or from 25 μm to 50 μm.

The core layer of the multilayer films disclosed herein may make up from 5 wt. % to 90 wt. % of the total weight of the multilayer film. In some embodiments, the core layer may make up from 5 wt. % to 70 wt. %, from 5 wt. % to 60 wt. %, from 5 wt. % to 50 wt. %, from 5 wt. % to 40 wt. %, from 5 wt. % to 30 wt. %, from 5 wt. % to 20 wt. %, from 5 wt. % to 10 wt. %, from 10 wt. % to 40 wt. %, from 10 wt. % to 30 wt. %, from 10 wt. % to 20 wt. %, from 20 wt. % to 40 wt. %, from 20 wt. % to 30 wt. %, or from 30 wt. % to 40 wt. % of the total weight of the multilayer film.

The core layer may include a polyethylene composition, which will be described in more detail subsequently in this disclosure. The polyethylene composition may exhibit a balance of toughness and tear strength, which allows for multilayer films with improved abuse properties (i.e., dart, puncture energy, tear). For example, the polyethylene composition presently disclosed may have high dart strengths at relatively high densities. As described subsequently in this disclosure in more detail, such improved properties may include improved creep, stretch, toughness. These improved properties may further allow for multilayer films that can be produced using less materials ("downgauging," i.e., using thinner film thicknesses), or using a more simplified process, as compared to conventional multilayer films.

In one or more embodiments, the core layer may include at least 50% by weight of the polyethylene composition, based on the total weight of the core layer. In some embodiments, the core layer may include from about 10 wt. % to about 100 wt. %, from about 10 wt. % to about 80 wt. %, from about 10 wt. % to about 60 wt. %, from about 10 wt. % to about 40 wt. %, from about 10 wt. % to about 20 wt. %, from about 20 wt. % to about 100 wt. %, from about 20 wt. % to about 80 wt. %, from about 20 wt. % to about 60 wt. %, from about 20 wt. % to about 40 wt. %, from about 40 wt. % to about 100 wt. %, from about 40 wt. % to about 80 wt. %, from about 40 wt. % to about 60 wt. %, from about 60 wt. % to about 100 wt. %, from about 60 wt. % to about 80 wt. %, or from about 80 wt. % to about 100 wt. % of the polyethylene composition, based on the total weight of the core layer.

In some embodiments, the core layer may include a blend of one or more additional materials with the polyethylene composition. In embodiments, the blend may include a high density polyethylene (HDPE), a low density polyethylene (LDPE), or combinations.

Optionally, in some embodiments, the core layer may include a high density polyethylene (HDPE). High density polyethylene may be incorporated into the core layer to increase the stiffness of the core layer. In some applications, it may be important for the multilayer film to possess adequate stiffness, demonstrated by tensile modulus, for example, to prevent deformation and to prevent breakage.

In embodiments, the high density polyethylene have a density from 0.935 g/cm$^3$ and up to about 0.980 g/cm$^3$ when measured according to ASTM D792. In another embodiment, the high density polyethylene may a density from 0.935 g/cm$^3$ to 0.970 g/cm$^3$, from 0.935 g/cm$^3$ to 0.960 g/cm$^3$, from 0.935 g/cm$^3$ to 0.950 g/cm$^3$, from 0.935 g/cm$^3$ to 0.940 g/cm$^3$, from 0.940 g/cm$^3$ to 0.980 g/cm$^3$, from 0.940 g/cm$^3$ to 0.970 g/cm$^3$, from 0.940 g/cm$^3$ to 0.960 g/cm$^3$, from 0.940 g/cm$^3$ to 0.950 g/cm$^3$, from 0.950 g/cm$^3$ to 0.980 g/cm$^3$, from 0.950 g/cm$^3$ to 0.970 g/cm$^3$, from 0.950 g/cm$^3$ to 0.960 g/cm$^3$, from 0.960 g/cm$^3$ to 0.980 g/cm$^3$, from 0.960 g/cm$^3$ to 0.970 g/cm$^3$, or from 0.970 g/cm$^3$ to 0.980 g/cm$^3$.

In one or more embodiments, the core layer may include a high density polyethylene having a melt index ($I_2$) from 0.1 grams per 10 minutes (g/10 min) to 10.0 g/10 min when measured according to ASTM D1238 at a load of 2.16 kg and temperature of 190° C. It is also contemplated that the melt index ($I_2$) of the high density polyethylene may be from 0.1 g/10 min to 5.0 g/10 min, from 0.1 g/10 min to 1.0 g/10 min, or from 1.0 g/10 min to 10.0 g/10 min, from 1.0 g/10 min to 5.0 g/10 min, or from 5.0 g/10 min to 10.0 g/10 min.

Various methodologies are contemplated for producing high density polyethylene. For example, high density polyethylene resins may be made using Ziegler-Natta catalyst systems, chrome catalysts or single-site catalysts including, but not limited to, bis-metallocene catalysts and constrained geometry catalysts.

In one or more embodiments, the core layer may include up to 50% by weight of high density polyethylene, based on the total weight of the core layer. In some embodiments, the core layer may include from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % of high density polyethylene, based on the total weight of the core layer.

Optionally, in some embodiments, the core layer may include a low density polyethylene (LDPE). In one or more embodiments, the low density polyethylene may have a melt index from 0.1 g/10 min to 10.0 g/10 min when measured according to ASTM D1238 at a load of 2.16 kg and temperature of 190° C. In other embodiments, the low density polyethylene may have a melt index from 0.1 g/10 min to 5.0 g/10 min, or from 0.5 g/10 min to 5.0 g/10 min, or from 0.5 g/10 min to 2.0 g/10 min. In embodiments, the low density polyethylene may have a density of from 0.916 g/cm$^3$ to 0.935 g/cm$^3$ when measured according to ASTM D792. In another embodiment, the low density polyethylene may a density from 0.916 g/cm$^3$ to 0.925 g/cm$^3$.

In one or more embodiments, the core layer may include less than 50% by weight low density polyethylene, based on the total weight of the core layer. In some embodiments, the core layer may include from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % low density polyethylene, based on the total weight of the core layer.

Outer Layers

As stated previously, the presently-disclosed multilayer films may include outer layers, which may also be referred to as "skin layers." The outer layers may include the second layer and the third layer. In the multilayer film designated as three-layer structure, A/B/C, the outer layers may be designated as A and C. The second layer may be designated as A. the third layer may be designated as C. In further embodiments, the second layer, the third layer, or both may be the outermost layers of the multilayer film. In further embodiments, the second layer, the third layer, or both may be in direct contact with the first layer.

The second layer, the third layer, or both of the multilayer film may each have a thickness of from 0.5 micrometers (μm or microns) to 60 μm. In other embodiments, the second layer, the third layer, or both of the multilayer film may have a thickness of from 0.5 μm to 50 μm, from 0.5 μm to 25 μm, from 0.5 μm to 10 μm, from 0.5 μm to 5 μm, from 0.5 μm to 1.0 μm, from 1.0 μm to 50 μm, from 1.0 μm to 25 μm, from 1.0 μm to 10 μm, from 1.0 μm to 5 μm, from 5 μm to 50 μm, from 5 μm to 25 μm, from 5 μm to 10 μm, from 10 μm to 50 μm, from 10 μm to 25 μm, or from 25 μm to 50 μm.

The second layer, the third layer, or both of the multilayer film may make up from 5 wt. % to 90 wt. % of the total weight of the multilayer film. In some embodiments, the second layer, the third layer, or both of the multilayer film of Exemplary Embodiment 1 may make up from 10 wt. % to 90 wt. %, from 20 wt. % to 80 wt. %, from 30 wt. % to 60 wt. %, or from 30 wt. % to 40 wt. % of the total weight of the multilayer film.

In various embodiments, the second layer, the third layer, or both may include one or more materials that impart properties into the multilayer film that aid in stretch, processability, and others. In some embodiments, the second layer and the third layer may include the same materials. In other embodiments, the second layer and the third layer may include different materials. In embodiments, the second layer may include a first polyolefin. In embodiments, the third layer may include a second polyolefin. The first polyolefin and the second polyolefin may be the same or different in composition. In some embodiments, the first polyolefin, the second polyolefin, or both, may include a polyethylene having a density of from 0.900 g/cm³ to 0.970 g/cm³. In some embodiments, the polyethylene of the second layer, the third layer, or both, may include one or more of an LLDPE, an HDPE, an MDPE, and an LDPE.

In one or more embodiments, the second layer, the third layer, or both may include a linear low density polyethylene (LLDPE) having a density from 0.905 g/cm³ to 0.930 g/cm³ when measured according to ASTM D792. In another embodiment, the density of the linear low density polyethylene may be from 0.905 g/cm³ to 0.925 g/cm³, from 0.905 g/cm³ to 0.920 g/cm³, from 0.905 g/cm³ to 0.915 g/cm³, from 0.905 g/cm³ to 0.910 g/cm³, from 0.910 g/cm³ to 0.930 g/cm³, from 0.910 g/cm³ to 0.925 g/cm³, from 0.910 g/cm³ to 0.920 g/cm³, from 0.910 g/cm³ to 0.915 g/cm³, from 0.915 g/cm³ to 0.930 g/cm³, from 0.915 g/cm³ to 0.925 g/cm³, from 0.915 g/cm³ to 0.920 g/cm³, from 0.920 g/cm³ to 0.930 g/cm³, from 0.920 g/cm³ to 0.925 g/cm³, from 0.925 g/cm³ to 0.930 g/cm³.

In one or more embodiments, the second layer, the third layer, or both may include a linear low density polyethylene (LLDPE) having a melt index ($I_2$) from 0.2 grams per 10 minutes (g/10 min) to 2.0 g/10 min when measured according to ASTM D1238. It is also contemplated that the melt index ($I_2$) of the linear low density polyethylene may be from 0.2 g/10 min to 1.5 g/10 min, from 0.2 g/10 min to 1.0 g/10 min, or from 0.2 g/10 min to 0.5 g/10 min, from 0.5 g/10 min to 2.0 g/10 min, from 0.5 g/10 min to 1.5 g/10 min, from 0.5 g/10 min to 1.0 g/10 min, from 1.0 g/10 min to 2.0 g/10 min from 1.0 g/10 min to 1.5 g/10 min, or from 1.5 g/10 min to 2.0 g/10 min.

According to embodiments, the linear low density polyethylene may have a molecular weight distribution, expressed as the ratio of the weight average molecular weight to number average molecular weight (Mw/Mn), in the range of from 3.5 to 5.5. In additional embodiments, the linear low density polyethylene may have a molecular weight distribution in the range from 3.5 to 4.5 or from 4.5 to 5.5.

According to one or more additional embodiments, the linear low density polyethylene may have a zero shear viscosity ratio of from 1.2 to 3.0, when measured according to the test methods described herein. In other embodiments, the linear low density polyethylene may have a zero shear viscosity ratio of from 1.2 to 2.5, from 1.2 to 2.0, from 2.0 to 3.0, from 2.0 to 2.5, or from 2.5 to 3.0.

Various methodologies are contemplated for producing linear low density polyethylenes. For example, linear low density polyethylene resins may be made using Ziegler-Natta catalyst systems, resin made using single-site catalysts including, but not limited to, bis-metallocene catalysts and constrained geometry catalysts, and resin made using post-metallocene molecular catalysts. Linear low density polyethylene resins may include linear, substantially linear or heterogeneous polyethylene copolymers or homopolymers. Linear low density polyethylene resins may contain less long chain branching than LDPEs and include substantially linear polyethylenes, which are further defined in U.S. Pat. No. 5,272,236, U.S. Pat. No. 5,278,272, U.S. Pat. No. 5,582,923 and U.S. Pat. No. 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. No. 3,914,342 or U.S. Pat. No. 5,854,045). Linear low density polyethylene resins may be made via gas-phase, solution-phase or slurry polymerization or any combination thereof, using any type of reactor or reactor configuration known in the art.

In one or more embodiments, the second layer, the third layer, or both may include from 0 wt. % to 100 wt. % linear low density polyethylene, based on the total weight of the respective layer. In some embodiments, the second layer, the third layer, or both may include from about 50 wt. % to about 100 wt. %, from about 50 wt. % to about 80 wt. %, from about 50 wt. % to about 60 wt. %, from about 60 wt. % to about 100 wt. %, from about 60 wt. % to about 80 wt. %, or from about 80 wt. % to about 100 wt. % of LLDPE, based on the total weight of the respective layer.

Optionally, in some embodiments, the second layer, the third layer, or both may include a high density polyethylene (HDPE) having a density from 0.935 g/cm³ and up to about 0.980 g/cm³ when measured according to ASTM D792. In another embodiment, the high density polyethylene may a density from 0.935 g/cm³ to 0.970 g/cm³, from 0.935 g/cm³ to 0.960 g/cm³, from 0.935 g/cm³ to 0.950 g/cm³, from 0.935 g/cm³ to 0.940 g/cm³, from 0.940 g/cm³ to 0.980 g/cm³, from 0.940 g/cm³ to 0.970 g/cm³, from 0.940 g/cm³ to 0.960 g/cm³, from 0.940 g/cm³ to 0.950 g/cm³, from 0.950 g/cm³ to 0.980 g/cm³, from 0.950 g/cm³ to 0.970 g/cm$^3$, from 0.950 g/cm$^3$ to 0.960 g/cm$^3$, from 0.960 g/cm$^3$ to 0.980 g/cm$^3$, from 0.960 g/cm$^3$ to 0.970 g/cm$^3$, or from 0.970 g/cm$^3$ to 0.980 g/cm$^3$.

In one or more embodiments, the second layer, the third layer, or both may include a high density polyethylene having a melt index ($I_2$) from 0.1 grams per 10 minutes (g/10 min) to 10.0 g/10 min when measured according to ASTM D1238 at a load of 2.16 kg and temperature of 190° C. It is also contemplated that the melt index ($I_2$) of the high density polyethylene may be from 0.1 g/10 min to 5.0 g/10 min, from 0.1 g/10 min to 1.0 g/10 min, or from 1.0 g/10 min to 10.0 g/10 min, from 1.0 g/10 min to 5.0 g/10 min, or from 5.0 g/10 min to 10.0 g/10 min.

Various methodologies are contemplated for producing high density polyethylene. For example, high density polyethylene resins may be made using Ziegler-Natta catalyst systems, chrome catalysts or single-site catalysts including, but not limited to, bis-metallocene catalysts and constrained geometry catalysts.

In one or more embodiments, the second layer, the third layer, or both may include up to 50% by weight of high density polyethylene, based on the total weight of the respective layer. In some embodiments, the second layer, the third layer, or both may include from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % of high density polyethylene, based on the total weight of the respective layer.

Optionally, in some embodiments, the second layer, the third layer, or both may include a medium density polyethylene (MDPE). In one or more embodiments, the medium density polyethylene may have a melt index from 0.1 g/10 min to 10.0 g/10 min when measured according to ASTM D1238 at a load of 2.16 kg and temperature of 190° C. In other embodiments, the medium density polyethylene may have a melt index from 0.1 g/10 min to 5.0 g/10 min, or from 0.5 g/10 min to 5.0 g/10 min, or from 0.5 g/10 min to 2.0 g/10 min. In embodiments, the medium density polyethylene may have a density of from 0.924 g/cm$^3$ to 0.942 g/cm$^3$ when measured according to ASTM D792. In another embodiment, the low density polyethylene may a density from 0.924 g/cm$^3$ to 0.936 g/cm$^3$.

In one or more embodiments, the second layer, the third layer, or both may include less than 50% by weight medium density polyethylene, based on the total weight of the respective layer. In some embodiments, the second layer, the third layer, or both may include from about 0 wt. % to about 100 wt. %, from about 0 wt. % to about 80 wt. %, from about 0 wt. % to about 60 wt. %, from about 0 wt. % to about 0 wt. %, from about 0 wt. % to about 20 wt. %, from about 10 wt. % to about 100 wt. %, from about 10 wt. % to about 80 wt. %, from about 10 wt. % to about 60 wt. %, from about 10 wt. % to about 40 wt. %, from about 10 wt. % to about 20 wt. %, from about 20 wt. % to about 100 wt. %, from about 20 wt. % to about 80 wt. %, from about 20 wt. % to about 60 wt. %, from about 20 wt. % to about 40 wt. %, from about 40 wt. % to about 100 wt. %, from about 40 wt. % to about 80 wt. %, from about 40 wt. % to about 60 wt. %, from about 60 wt. % to about 100 wt. %, from about 60 wt. % to about 80 wt. %, or from about 80 wt. % to about 100 wt. % of MDPE, based on the total weight of the respective layer.

The second layer, the third layer, or both may include a polyethylene composition, which will be described in more detail subsequently in this disclosure. The polyethylene composition may exhibit a balance of toughness and tear strength, which allows for multilayer films with improved abuse properties (i.e., dart, puncture energy, tear). For example, the polyethylene composition presently disclosed may have high dart strengths at relatively high densities. As described subsequently in more detail, such improved properties may include improved creep, stretch, toughness. These improved properties may further allow for multilayer films that can be produced using less materials ("downgauging," i.e., using thinner film thicknesses), or using a more simplified process, as compared to conventional multilayer films.

In one or more embodiments, the second layer, the third layer, or both may include from about 0 wt. % to about 100 wt. %, from about 0 wt. % to about 80 wt. %, from about 0 wt. % to about 60 wt. %, from about 0 wt. % to about 0 wt. %, from about 0 wt. % to about 20 wt. %, from about 10 wt. % to about 100 wt. %, from about 10 wt. % to about 80 wt. %, from about 10 wt. % to about 60 wt. %, from about 10 wt. % to about 40 wt. %, from about 10 wt. % to about 20 wt. %, from about 20 wt. % to about 100 wt. %, from about 20 wt. % to about 80 wt. %, from about 20 wt. % to about 60 wt. %, from about 20 wt. % to about 40 wt. %, from about 40 wt. % to about 100 wt. %, from about 40 wt. % to about 80 wt. %, from about 40 wt. % to about 60 wt. %, from about 60 wt. % to about 100 wt. %, from about 60 wt. % to about 80 wt. %, or from about 80 wt. % to about 100 wt. % of the polyethylene composition, based on the total weight of the respective layer.

Optionally, in some embodiments, the second layer, the third layer, or both may include a low density polyethylene (LDPE). In one or more embodiments, the low density polyethylene may have a melt index from 0.1 g/10 min to 10.0 g/10 min when measured according to ASTM D1238 at a load of 2.16 kg and temperature of 190° C. In other embodiments, the low density polyethylene may have a melt index from 0.1 g/10 min to 5.0 g/10 min, or from 0.5 g/10 min to 5.0 g/10 min, or from 0.5 g/10 min to 2.0 g/10 min. In embodiments, the low density polyethylene may have a density of from 0.916 g/cm$^3$ to 0.935 g/cm$^3$ when measured according to ASTM D792. In another embodiment, the low density polyethylene may a density from 0.916 g/cm$^3$ to 0.925 g/cm$^3$.

In one or more embodiments, the second layer, the third layer, or both may include less than 50% by weight low density polyethylene, based on the total weight of the respective layer. In some embodiments, the second layer, the third layer, or both may include from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % low density polyethylene, based on the total weight of the respective layer.

Additional Layers

As stated previously, in some embodiments, the multilayer film may include one or more additional layers. In some embodiments, a multilayer film of the present disclosure may comprise up to 11, 13, 15, or more layers.

The one or more additional layers may include one or more materials that impart properties into the multilayer film that aid in stretch, processability, stiffness, and others. In embodiments, the one or more additional layers may include one or more polyolefins. In some embodiments, the include one or more polyolefins may include one or more polyethylenes having a density of from 0.900 g/cm$^3$ to 0.970 g/cm$^3$. In some embodiments, the one or more polyethylenes of the one or more additional layers may include an LLDPE, an HDPE, an MDPE, LDPE, the polyethylene compositions, or combinations.

In some embodiments, the multilayer films may optionally include tie layers to facilitate adhesion between layers. In some embodiments, the tie layers may be positioned between the core layer and each outer layer. In a multilayer film designated as A/tie-1/B/tie-2/C, the core layer may be designated as B, the outer layers may be designated as A and C, and the tie layers may be designated as tie-1 and tie-2. The second layer may be designated as A. The third layer may be designated as C. In further embodiments, the second layer, the third layer, or both may be the outermost layers of the multilayer film. In further embodiments, a first tie layer (tie-1) may be in direct contact with one or both of the first layer and the second layer. In further embodiments, a second tie layer (tie-2) may be in direct contact with one or both of the first layer and the third layer. In some such embodiments, the tie layers may comprise a maleic anhydride grafted polyethylene or other functionalized resins that are known to be useful as tie layers. A suitable commercial example of the maleic anhydride grafted polyethylene is AMPLIFY™ TY 1057 from The Dow Chemical Company (Midland, MICH.), and others known to those of skill in the art can also be used.

In some embodiments, the multilayer films may optionally include barrier. Suitable barrier layers may be chosen from layers comprising ethylene vinyl alcohol copolymer, cyclic olefin copolymers, polyvinyl acetate, or blends of one or more of these polymers with polyethylene, polyvinyl alcohol, or polyamide.

Exemplary Embodiment 1

As stated previously, there are needs for multilayer films that exhibit physical properties, such as dart/bag drop, puncture, tear, and creep resistance, that meet customer and industry requirements. In some embodiments, these multilayer films may still maintain physical properties that meet customer and industry requirements even at reduced thicknesses.

Reference will now be made to an embodiment of the presently-described multilayer film, herein referred to as "Exemplary Embodiment 1." Exemplary Embodiment 1 may include a first layer including a polyethylene composition, a second layer including a first linear low density polyethylene, and a third layer including a second linear low density polyethylene. The core layer of Exemplary Embodiment 1 may include a polyethylene composition, which will be described in more detail subsequently in this disclosure. While utilized in a film, the polyethylene composition may exhibit a balance of toughness and stiffness, which allows for multilayer films of Exemplary Embodiment 1 with improved abuse properties (i.e., dart, puncture energy, tear). For example, utilizing the polyethylene composition presently disclosed provide a core layer that exhibits relatively high dart strengths at relatively high densities. These improved properties may further allow for embodiments of multilayer films of Exemplary Embodiment 1 that can be produced using less materials ("downgauging," i.e., using thinner film thicknesses), or using a more simplified process, as compared to conventional multilayer films.

The multilayer film of Exemplary Embodiment 1 can have a variety of thicknesses. In further embodiments, the multilayer film of Exemplary Embodiment 1 may have a thickness of less than 150 micrometers (μm or microns). In other embodiments, the multilayer film may have a thickness of from 15 μm to 120 μm. In other embodiments, the multilayer film may have an overall thickness of from 25 μm to 100 μm, 25 μm to 75 μm, 25 μm to 50 μm, from 50 μm to 150 μm, 50 μm to 100 μm, 50 μm to 75 μm, 75 μm to 150 μm, 75 μm to 100 μm, or 100 μm to 150 μm.

In embodiments, the multilayer film of Exemplary Embodiment 1 may have an overall density of at least 0.925 grams per cubic centimeter ($g/cm^3$). In other embodiments, the overall density of the multilayer film of Exemplary Embodiment 1 may be from 0.925 $g/cm^3$ to 0.940 $g/cm^3$, from 0.925 $g/cm^3$ to 0.935 $g/cm^3$, from 0.925 $g/cm^3$ to 0.930 $g/cm^3$, from 0.930 $g/cm^3$ to 0.940 $g/cm^3$, from 0.930 $g/cm^3$ to 0.935 $g/cm^3$, or from 0.935 $g/cm^3$ to 0.940 $g/cm^3$.

In embodiments, the multilayer films of Exemplary Embodiment 1 may have may have relatively good dart strength when measured according to ASTM D1709 Method B. In embodiments, the multilayer film of Exemplary Embodiment 1 may have a dart drop impact of at least 400 grams when measured according to ASTM D1709 Method B. In other embodiments, the multilayer film of Exemplary Embodiment 1 may have a dart drop impact of from 400 grams to 2000 grams, from 400 grams to 1500 grams, 400 grams to 1000 grams, from 700 grams to 2000 grams, from 700 grams to 1500 grams, 700 grams to 1000 grams, from 1000 grams to 2000 grams, from 1000 grams to 1500 grams, or from 1500 grams to 2000 grams when measured according to ASTM D1709 Method A.

The multilayer film of Exemplary Embodiment 1 may have an average secant modulus in a machine direction of at least 50,000 psi, when measured in accordance with ASTM D882. In other embodiments, the multilayer film may have an average secant modulus in a machine direction of at least 55,000 psi or 60,000 psi, when measured in accordance with ASTM D882. The multilayer films of the present disclosure may have an average secant modulus in a cross direction of at least 55,000 psi, when measured in accordance with ASTM D882. In other embodiments, the multilayer film may have an average secant modulus in a cross direction of at least 60,000 psi or 70,000 psi, when measured in accordance with ASTM D882.

The core layer of the multilayer film of Exemplary Embodiment 1 may have a thickness of from 0.5 micrometers (μm or microns) to 60 μm. In other embodiments, the core layer may have a thickness of from 0.5 μm to 50 μm, from 0.5 μm to 25 μm, from 0.5 μm to 10 μm, from 0.5 μm to 5 μm, from 0.5 μm to 1.0 μm, from 1.0 μm to 50 μm, from 1.0 μm to 25 μm, from 1.0 μm to 10 μm, from 1.0 μm to 5 μm, from 5 μm to 50 μm, from 5 μm to 25 μm, from 5 μm to 10 μm, from 10 μm to 50 μm, from 10 μm to 25 μm, or from 25 μm to 50 μm.

The core layer of the multilayer films of Exemplary Embodiment 1 may make up from 10 wt. % to 80 wt. % of the total weight of the multilayer film of Exemplary Embodiment 1. In some embodiments, the core layer may make up from 10 wt. % to 60 wt. %, from 10 wt. % to 40 wt. %, from 10 wt. % to 30 wt. %, from 10 wt. % to 20 wt. %, from 20 wt. % to 80 wt. %, from 20 wt. % to 40 wt. %, from 20 wt. % to 30 wt. %, from 30 wt. % to 80 wt. %, from 30 wt. % to 60 wt. %, or from 30 wt. % to 40 wt. % of the total weight of the multilayer film of Exemplary Embodiment 1.

In one or more embodiments, the core layer of Exemplary Embodiment 1 may include at least 10% by weight of the polyethylene composition, based on the total weight of the core layer. In some embodiments, the core layer may include from about 10 wt. % to about 100 wt. %, from about 10 wt. % to about 80 wt. %, from about 10 wt. % to about 60 wt. %, from about 10 wt. % to about 40 wt. %, from about 10 wt. % to about 20 wt. %, from about 20 wt. % to about 100 wt. %, from about 20 wt. % to about 80 wt. %, from about 20 wt. % to about 60 wt. %, from about 20 wt. % to about 40 wt. %, from about 40 wt. % to about 100 wt. %, from about 40 wt. % to about 80 wt. %, from about 40 wt. % to about 60 wt. %, from about 60 wt. % to about 100 wt. %, from about 60 wt. % to about 80 wt. %, or from about 80 wt. % to about 100 wt. % of the polyethylene composition, based on the total weight of the core layer.

Optionally, in some embodiments, the core layer of Exemplary Embodiment 1 may include a low density polyethylene (LDPE). In one or more embodiments, core layer may include less than 50% by weight low density polyethylene, based on the total weight of the core layer. In some embodiments, the core layer of Exemplary Embodiment 1 may include from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % low density polyethylene, based on the total weight of the core layer.

The second layer, the third layer, or both of the multilayer film of Exemplary Embodiment 1 may each have a thickness of from 0.5 micrometers (μm or microns) to 60 μm. In other embodiments, the second layer, the third layer, or both of the multilayer film of Exemplary Embodiment 1 may have a thickness of from 0.5 μm to 50 μm, from 0.5 μm to 25 μm, from 0.5 μm to 10 μm, from 0.5 μm to 5 μm, from 0.5 μm to 1.0 μm, from 1.0 μm to 50 μm, from 1.0 μm to 25 μm, from 1.0 μm to 10 μm, from 1.0 μm to 5 μm, from 5 μm to 50 μm, from 5 μm to 25 μm, from 5 μm to 10 μm, from 10 μm to 50 μm, from 10 μm to 25 μm, or from 25 μm to 50 μm.

The second layer, the third layer, or both of the multilayer film of Exemplary Embodiment 1 may make up from 10 wt. % to 90 wt. % of the total weight of the multilayer film of Exemplary Embodiment 1. In some embodiments, the second layer, the third layer, or both of the multilayer film of Exemplary Embodiment 1 may make up from 20 wt. % to 80 wt. %, from 30 wt. % to 60 wt. %, or from 30 wt. % to 40 wt. % of the total weight of the multilayer film of Exemplary Embodiment 1.

In one or more embodiments, the second layer, the third layer, or both may include greater than 50% by weight linear low density polyethylene, based on the total weight of the respective layer. In some embodiments, the second layer, the third layer, or both may include from about 50 wt. % to about 100 wt. %, from about 50 wt. % to about 80 wt. %, from about 50 wt. % to about 60 wt. %, from about 60 wt. % to about 100 wt. %, from about 60 wt. % to about 80 wt. %, or from about 80 wt. % to about 100 wt. % of LLDPE, based on the total weight of the respective layer.

Optionally, in some embodiments, the second layer, the third, or both of Exemplary Embodiment 1 may include a low density polyethylene (LDPE). In one or more embodiments, the second layer, the third layer, or both may include less than 50% by weight low density polyethylene, based on the total weight of the respective layer. In some embodiments, the second layer, the third layer, or both of Exemplary Embodiment 1 may include from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % low density polyethylene, based on the total weight of the respective layer.

Exemplary Embodiment 2

As stated previously, there are needs for multilayer films that exhibit physical properties, such as dart/bag drop, puncture, tear, and creep resistance that meet customer and industry requirements. In some embodiments, these multilayer films may still maintain physical properties that meet customer and industry requirements even at reduced thicknesses.

Reference will now be made to an embodiment of the presently-described multilayer film, herein referred to as "Exemplary Embodiment 2." Exemplary Embodiment 2 may include a first layer including a polyethylene composition and a high density polyethylene, a second layer including a first linear low density polyethylene, and a third layer including a second linear low density polyethylene. The core layer of Exemplary Embodiment 2 may include a polyethylene composition, which will be described in more detail subsequently in this disclosure. The polyethylene composition may exhibit a balance of toughness and tear strength, which allows for multilayer films of Exemplary Embodiment 2 to exhibit improved abuse properties (i.e., dart, puncture energy, tear). For example, utilizing the polyethylene composition presently disclosed provide a core layer that exhibits relatively high dart strengths at relatively high densities. These improved properties may further allow for embodiments of multilayer films of Exemplary Embodiment 2 that can be produced using less materials ("downgauging," i.e., using thinner film thicknesses), or using a more simplified process, as compared to conventional multilayer films.

The multilayer film of Exemplary Embodiment 2 can have a variety of thicknesses. In further embodiments, the multilayer film of Exemplary Embodiment 2 may have a thickness of less than 500 micrometers (μ or microns). In other embodiments, the multilayer film may have a thickness of from 15 μm to 500 μm or 15 μm to 260 μm. In other embodiments, the multilayer film may have an overall thickness of from 15 μm to 200 μm, 15 μm to 150 μm, 15 μm to 100 μm, from 15 μm to 50 μm, 50 μm to 500 μm, 50 μm to 260 μm, 50 μm to 200 μm, 50 μm to 150 μm, 50 μm to 100 μm, 100 μm to 500 μm, from 100 μm to 260 μm, 100 μm to 200 μm, 100 μm to 150 μm, 150 μm to 500 μm, 150 μm to 260 μm, 150 μm to 200 μm, 200 μm to 500 μm, 200 μm to 260 μm, or 260 μm to 500 μm.

In embodiments, the multilayer film of Exemplary Embodiment 1 may have an overall density of at least 0.925 grams per cubic centimeter (g/cm$^3$). In other embodiments, the overall density of the multilayer film of Exemplary Embodiment 2 may be from 0.925 g/cm$^3$ to 0.940 g/cm$^3$, from 0.925 g/cm$^3$ to 0.935 g/cm$^3$, from 0.925 g/cm$^3$ to 0.930 g/cm$^3$, from 0.930 g/cm$^3$ to 0.940 g/cm$^3$, from 0.930 g/cm$^3$ to 0.935 g/cm$^3$, or from 0.935 g/cm$^3$ to 0.940 g/cm$^3$.

In embodiments, the multilayer film of Exemplary Embodiment 2 may have a dart drop impact of at least 600 grams when measured according to ASTM D1709 Method A. In other embodiments, the multilayer film of Exemplary Embodiment 2 may have a dart drop impact of from 600 grams to 2000 grams, from 600 grams to 1500 grams, 600 grams to 1000 grams, from 700 grams to 2000 grams, from 700 grams to 1500 grams, 700 grams to 1000 grams, from 1000 grams to 2000 grams, from 1000 grams to 1500 grams, or from 1500 grams to 2000 grams when measured according to ASTM D1709 Method A. In further embodiments, the multilayer films of Exemplary Embodiment 2 may have may have relatively good dart strength when measured according to ASTM D1709 Method B. In embodiments, the multilayer film of Exemplary Embodiment 2 may have a dart drop impact of at least 400 grams when measured according to ASTM D1709 Method B. In other embodiments, the multilayer film of Exemplary Embodiment 2 may have a dart drop impact of from 400 grams to 2000 grams, from 400 grams to 1500 grams, 400 grams to 1000 grams, from 700 grams to 2000 grams, from 700 grams to 1500 grams, 700 grams to 1000 grams, from 1000 grams to 2000 grams, 1000 grams to 1500 grams, or from 1500 grams to 2000 grams when measured according to ASTM D1709 Method A.

The multilayer film of Exemplary Embodiment 2 may have a tensile creep in a cross direction of less than 50%, when measured in accordance with ASTM 2990. In other embodiments, the multilayer film of Exemplary Embodiment 2 may have a tensile creep of less than 40% or less than 30%, when measured in accordance with ASTM 2990.

The multilayer film of Exemplary Embodiment 2 may have a puncture energy at break of greater than 30 ft*lbf/in$^3$, when measured according to the test methods described subsequently in this disclosure. In other embodiments, the multilayer film of Exemplary Embodiment 2 may have a puncture energy at break of greater than 40 ft*lbf/in$^3$ or 50 ft*lbf/in$^3$, when measured according to the test methods described subsequently in this disclosure.

The multilayer film of Exemplary Embodiment 2 may have an average secant modulus in a machine direction of at least 50,000 psi, when measured in accordance with ASTM D882. In embodiments, the multilayer film may have an average secant modulus in a machine direction of at least 55,000 psi or 60,000 psi, when measured in accordance with ASTM D882. The multilayer films of the present disclosure may have an average secant modulus in a cross direction of at least 55,000 psi, when measured in accordance with ASTM D882. In other embodiments, the multilayer film may have an average secant modulus in a cross direction of at least 60,000 psi or 70,000 psi, when measured in accordance with ASTM D882.

The core layer of the multilayer film of Exemplary Embodiment 2 may have a thickness of from 0.5 micrometers (μm or microns) to 60 μm. In other embodiments, the second layer may have a thickness of from 0.5 μm to 50 μm, from 0.5 μm to 25 μm, from 0.5 μm to 10 μm, from 0.5 μm to 5 μm, from 0.5 μm to 1.0 μm, from 1.0 μm to 50 μm, from 1.0 μm to 25 μm, from 1.0 μm to 10 μm, from 1.0 μm to 5 μm, from 5 μm to 50 μm, from 5 μm to 25 μm, from 5 μm to 10 μm, from 10 μm to 50 μm, from 10 μm to 25 μm, or from 25 μm to 50 μm.

The core layer of the multilayer films of Exemplary Embodiment 2 may make up from 5 wt. % to 60 wt. % of the total weight of the multilayer film of Exemplary Embodiment 2. In some embodiments, the core layer may make up from 5 wt. % to 30 wt. %, from 5 wt. % to 20 wt. %, from 5 wt. % to 10 wt. %, from 10 wt. % to 40 wt. %, from 10 wt. % to 30 wt. %, from 10 wt. % to 20 wt. %, from 20 wt. % to 40 wt. %, from 20 wt. % to 30 wt. %, or from 30 wt. % to 40 wt. % of the total weight of the multilayer film of Exemplary Embodiment 2.

In one or more embodiments, the core layer of Exemplary Embodiment 2 may include at least 50% by weight of the polyethylene composition, based on the total weight of the core layer. In some embodiments, the core layer may include from about 10 wt. % to about 100 wt. %, from about 10 wt. % to about 80 wt. %, from about 10 wt. % to about 60 wt. %, from about 10 wt. % to about 40 wt. %, from about 10 wt. % to about 20 wt. %, from about 20 wt. % to about 100 wt. %, from about 20 wt. % to about 80 wt. %, from about 20 wt. % to about 60 wt. %, from about 20 wt. % to about 40 wt. %, from about 40 wt. % to about 100 wt. %, from about 40 wt. % to about 80 wt. %, from about 40 wt. % to about 60 wt. %, from about 60 wt. % to about 100 wt. %, from about 60 wt. % to about 80 wt. %, or from about 80 wt. % to about 100 wt. % of the polyethylene composition, based on the total weight of the core layer.

In embodiments, the core layer of Exemplary Embodiment 2 may include a high density polyethylene (HDPE). In one or more embodiments, the core layer may include up to 50% by weight of high density polyethylene, based on the total weight of the core layer. In some embodiments, the core layer may include from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % of high density polyethylene, based on the total weight of the core layer.

The second layer, the third layer, or both of the multilayer film of Exemplary Embodiment 2 may each have a thickness of from 0.5 micrometers (μ or microns) to 60 μm. In other embodiments, the second layer, the third layer, or both of the multilayer film of Exemplary Embodiment 1 may have a thickness of from 0.5 μm to 50 μm, from 0.5 μm to 25 μm, from 0.5 μm to 10 μm, from 0.5 μm to 5 μm, from 0.5 μm to 1.0 μm, from 1.0 μm to 50 μm, from 1.0 μm to 25 μm, from 1.0 μm to 10 μm, from 1.0 μm to 5 μm, from 5 μm to 50 μm, from 5 μm to 25 μm, from 5 μm to 10 μm, from 10 μm to 50 μm, from 10 μm to 25 μm, or from 25 μm to 50 μm.

The second layer, the third layer, or both of the multilayer film of Exemplary Embodiment 2 may make up from 5 wt. % to 40 wt. % of the total weight of the multilayer film of Exemplary Embodiment 2. In some embodiments, the second layer, the third layer, or both of the multilayer film of Exemplary Embodiment 2 may make up from 5 wt. % to 30 wt. %, from 5 wt. % to 20 wt. %, from 5 wt. % to 10 wt. %, from 10 wt. % to 40 wt. %, from 10 wt. % to 30 wt. %, from 10 wt. % to 20 wt. %, from 20 wt. % to 40 wt. %, from 20 wt. % to 30 wt. %, or from 30 wt. % to 40 wt. % of the total weight of the multilayer film of Exemplary Embodiment 2.

In one or more embodiments, the second layer, the third layer, or both of Exemplary Embodiment 2 may include from about 0 to about 100% by weight linear low density polyethylene, based on the total weight of the respective layer. In some embodiments, the second layer, the third layer, or both of Exemplary Embodiment 2 may include from about 5 wt. % to about 100 wt. %, from about 10 wt. % to about 90 wt. %, from about 20 wt. % to about 80 wt. %, from about 30 wt. % to about 70 wt. %, or from about 40 wt. % to about 50 wt. % of LLDPE, based on the total weight of the respective layer.

In one or more embodiments, the second layer, the third layer, or both of Exemplary Embodiment 2 may include from about 0 wt. % to about 100 wt. %, from about 0 wt. % to about 80 wt. %, from about 0 wt. % to about 60 wt. %, from about 0 wt. % to about 0 wt. %, from about 0 wt. % to about 20 wt. %, from about 10 wt. % to about 100 wt. %, from about 10 wt. % to about 80 wt. %, from about 10 wt. % to about 60 wt. %, from about 10 wt. % to about 40 wt. %, from about 10 wt. % to about 20 wt. %, from about 20 wt. % to about 100 wt. %, from about 20 wt. % to about 80 wt. %, from about 20 wt. % to about 60 wt. %, from about 20 wt. % to about 40 wt. %, from about 40 wt. % to about 100 wt. %, from about 40 wt. % to about 80 wt. %, from about 40 wt. % to about 60 wt. %, from about 60 wt. % to about 100 wt. %, from about 60 wt. % to about 80 wt. %, or from about 80 wt. % to about 100 wt. % of MDPE, based on the total weight of the respective layer.

In one or more embodiments, the second layer, the third layer, or both of Exemplary Embodiment 2 may include from about 0 wt. % to about 100 wt. %, from about 0 wt. % to about 80 wt. %, from about 0 wt. % to about 60 wt. %, from about 0 wt. % to about 0 wt. %, from about 0 wt. % to about 20 wt. %, from about 10 wt. % to about 100 wt. %, from about 10 wt. % to about 80 wt. %, from about 10 wt. % to about 60 wt. %, from about 10 wt. % to about 40 wt. %, from about 10 wt. % to about 20 wt. %, from about 20 wt. % to about 100 wt. %, from about 20 wt. % to about 80 wt. %, from about 20 wt. % to about 60 wt. %, from about 20 wt. % to about 40 wt. %, from about 40 wt. % to about 100 wt. %, from about 40 wt. % to about 80 wt. %, from about 40 wt. % to about 60 wt. %, from about 60 wt. % to about 100 wt. %, from about 60 wt. % to about 80 wt. %, or from about 80 wt. % to about 100 wt. % of the polyethylene composition, based on the total weight of the respective layer.

In one or more embodiments, the second layer, the third layer, or both of Exemplary Embodiment 2 may include less than 50% by weight of low density polyethylene, based on the total weight of the respective layer. In some embodiments, the second layer, the third layer, or both of Exemplary Embodiment 2 may include from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % of high density polyethylene, based on the total weight of the respective layer.

Exemplary Embodiment 3

As stated previously, there are needs for multilayer films that exhibit physical properties, such as temperature resistance, good gas barrier, high stiffness and outstanding toughness, without the use of polyamides. In conventional multilayer films, the inclusion of nylon in film structures presents a desirable balance of film properties between dart and film modulus, but may present process complexity, multilayer film structure complexity, non-recyclable multilayer films, and higher material costs are when compared to the material costs of other polyolefins.

Reference will now be made to an embodiment of the presently-described multilayer film, herein referred to as "Exemplary Embodiment 3." Exemplary Embodiment 3 may include a first layer including a first polyethylene composition and a first high density polyethylene; a second layer including a second polyethylene composition, a second high density polyethylene, and a first low density polyethylene; and a third layer including a third polyethylene composition and a second low density polyethylene. Embodiments of the multilayer film of Exemplary Embodiment 3, which include the polyethylene composition disclosed herein, may exhibit a superior balance of film properties (dart and modulus) by showing comparable or better dart than multilayer films that include polyamides, while showing improved modulus.

The multilayer film of Exemplary Embodiment 3 can have a variety of thicknesses. In further embodiments, the multilayer film of Exemplary Embodiment 3 may have a thickness of from 25 to 260 µm. In other embodiments, the multilayer film may have an overall thickness of from 25 µm to 200 µm, 25 µm to 150 µm, 25 µm to 100 µm, from 25 µm to 50 µm, 50 µm to 260 µm, 50 µm to 200 µm, 50 µm to 150 µm, 50 µm to 100 µm, from 100 µm to 260 µm, 100 µm to 200 µm, 100 µm to 150 µm, 150 µm to 260 µm, 150 µm to 200 µm, or 200 µm to 260 µm.

In embodiments, the multilayer film of Exemplary Embodiment 3 may have an overall density of at least 0.925 grams per cubic centimeter (g/cm³). In other embodiments, the overall density of the multilayer film of Exemplary Embodiment 3 may be from 0.925 g/cm³ to 0.940 g/cm³, from 0.925 g/cm³ to 0.935 g/cm³, from 0.925 g/cm³ to 0.930 g/cm³, from 0.930 g/cm³ to 0.940 g/cm³, from 0.930 g/cm³ to 0.935 g/cm³, or from 0.935 g/cm³ to 0.940 g/cm³.

In embodiments, the multilayer film of Exemplary Embodiment 3 may have a dart drop impact of at least 300 grams when measured according to ASTM D1709 Method A. In other embodiments, the multilayer film of Exemplary Embodiment 3 may have a dart drop impact of from 300 grams to 1000 grams, from 300 grams to 500 grams, from 300 grams to 400 grams, from 400 grams to 1000 grams, from 400 grams to 1000 grams, or from 400 grams to 500 grams when measured according to ASTM D1709 Method A. In further embodiments, the multilayer films of Exemplary Embodiment 3 may have may have relatively good dart strength when measured according to ASTM D1709 Method B. In embodiments, the multilayer film of Exemplary Embodiment 3 may have a dart drop impact of at least 300 grams when measured according to ASTM D1709 Method B. In other embodiments, the multilayer film of Exemplary Embodiment 3 may have a dart drop impact of from 300 grams to 1000 grams, from 300 grams to 500 grams, from 300 grams to 400 grams, from 400 grams to 1000 grams, from 400 grams to 1000 grams, or from 400 grams to 500 grams when measured according to ASTM D1709 Method B.

The multilayer film of Exemplary Embodiment 3 may have an average secant modulus in a machine direction of at least 50,000 psi, when measured in accordance with ASTM D882. In other embodiments, the multilayer film may have an average secant modulus in a machine direction of at least 55,000 psi or 60,000 psi, when measured in accordance with ASTM D882. The multilayer films of the present disclosure may have an average secant modulus in a cross direction of at least 55,000 psi, when measured in accordance with ASTM D882. In other embodiments, the multilayer film may have an average secant modulus in a cross direction of at least 60,000 psi or 70,000 psi, when measured in accordance with ASTM D882.

The core layer of the multilayer film of Exemplary Embodiment 3 may have a thickness of from 0.5 micrometers (µm or microns) to 60 µm. In other embodiments, the second layer may have a thickness of from 0.5 µm to 50 µm, from 0.5 µm to 25 µm, from 0.5 µm to 10 µm, from 0.5 µm to 5 µm, from 0.5 µm to 1.0 µm, from 1.0 µm to 50 µm, from 1.0 µm to 25 µm, from 1.0 µm to 10 µm, from 1.0 µm to 5 µm, from 5 µm to 50 µm, from 5 µm to 25 µm, from 5 µm to 10 µm, from 10 µm to 50 µm, from 10 µm to 25 µm, or from 25 µm to 50 µm.

The core layer of the multilayer films of Exemplary Embodiment 3 may make up from 30 wt. % to 80 wt. % of the total weight of the multilayer film of Exemplary Embodiment 3. In some embodiments, the core layer may make up from 30 wt. % 60 wt. %, from 30 wt. % to 40 wt. %, from 40 wt. % to 80 wt. %, from 40 wt. % to 60 wt. %, or from 60 wt. % to 80 wt. % of the total weight of the multilayer film of Exemplary Embodiment 3.

In one or more embodiments, the core layer of Exemplary Embodiment 3 may include from 40 wt. % to 100 wt. % of the polyethylene composition, based on the total weight of the core layer. In some embodiments, the core layer may include from about 10 wt. % to about 100 wt. %, from about 10 wt. % to about 80 wt. %, from about 10 wt. % to about 60 wt. %, from about 10 wt. % to about 40 wt. %, from about 10 wt. % to about 20 wt. %, from about 20 wt. % to about 100 wt. %, from about 20 wt. % to about 80 wt. %, from about 20 wt. % to about 60 wt. %, from about 20 wt. % to about 40 wt. %, from about 40 wt. % to about 100 wt. %, from about 40 wt. % to about 80 wt. %, from about 40 wt. % to about 60 wt. %, from about 60 wt. % to about 100 wt. %, from about 60 wt. % to about 80 wt. %, or from about 80 wt. % to about 100 wt. % of the polyethylene composition, based on the total weight of the core layer.

In embodiments, the core layer of Exemplary Embodiment 3 may include a high density polyethylene (HDPE). In one or more embodiments, the core layer may include up to 50% by weight of high density polyethylene, based on the total weight of the core layer. In some embodiments, the core layer may include from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % of high density polyethylene, based on the total weight of the core layer.

Optionally, in some embodiments, the core layer of Exemplary Embodiment 3 may include a low density polyethylene (LDPE). In one or more embodiments, the core layer of Exemplary Embodiment 3 may comprise less than 50% by weight low density polyethylene, based on the total weight of the core layer. In some embodiments, the core layer of Exemplary Embodiment 3 may include from about 0 wt. % to about 50 wt. %, from about 0 wt. % to about 40 wt. %, from about 0 wt. % to about 20 wt. %, from about 20 wt. % to about 50 wt. %, from about 20 wt. % to about 40 wt. %, or from about 40 wt. % to about 50 wt. % low density polyethylene, based on the total weight of the core layer.

The second layer, the third layer, or both of the multilayer film of Exemplary Embodiment 3 may each have a thickness of from 0.5 micrometers (μ or microns) to 60 μm. In other embodiments, the second layer, the third layer, or both of the multilayer film of Exemplary Embodiment 1 may have a thickness of from 0.5 μm to 50 μm, from 0.5 μm to 25 μm, from 0.5 μm to 10 μm, from 0.5 μm to 5 μm, from 0.5 μm to 1.0 μm, from 1.0 μm to 50 μm, from 1.0 μm to 25 μm, from 1.0 μm to 10 μm, from 1.0 μm to 5 μm, from 5 μm to 50 μm, from 5 μm to 25 μm, from 5 μm to 10 μm, from 10 μm to 50 μm, from 10 μm to 25 μm, or from 25 μm to 50 μm.

The second layer, the third layer, or both of the multilayer film of Exemplary Embodiment 3 may make up from 20 wt. % to 70 wt. % of the total weight of the multilayer film of Exemplary Embodiment 3. In some embodiments, the second layer, the third layer, or both of the multilayer film of Exemplary Embodiment 1 may make up from 20 wt. % to 60 wt. %, from 20 wt. % to 40 wt. %, from 40 wt. % to 70 wt. %, from 40 wt. % to 60 wt. %, or from 60 wt. % to 70 wt. % of the total weight of the multilayer film of Exemplary Embodiment 3.

In one or more embodiments, the second layer, the third layer, or both of Exemplary Embodiment 3 may include at least 40% by weight of the presently-described polyethylene composition, based on the total weight of the respective layer. In some embodiments, the second layer, the third layer, or both of Exemplary Embodiment 3 may include from about 50 wt. % to about 100 wt. %, from about 50 wt. % to about 80 wt. %, from about 50 wt. % to about 60 wt. %, from about 60 wt. % to about 100 wt. %, from about 60 wt. % to about 80 wt. %, or from about 80 wt. % to about 100 wt. % of the presently-described polyethylene composition, based on the total weight of the respective layer.

In one or more embodiments, the second layer, the third layer, or both of Exemplary Embodiment 3 may include less than 50% by weight high density polyethylene, based on the total weight of the respective layer. In some embodiments, only one of the second layer or the third layer may include high density polyethylene. In some embodiments, the second layer or the third layer may include from about 0 wt. % to about 50 wt. %, from about 0 wt. % to about 40 wt. %, from about 0 wt. % to about 20 wt. %, from about 5 wt. % to about 50 wt. %, from about 5 wt. % to about 40 wt. %, from about 5 wt. % to about 20 wt. %, from about 20 wt. % to about 50 wt. %, from about 20 wt. % to about 40 wt. %, or from about 40 wt. % to about 50 wt. % high density polyethylene, based on the total weight of the respective layer.

In one or more embodiments, the second layer, the third layer, or both of Exemplary Embodiment 3 may include less than 50% by weight low density polyethylene, based on the total weight of the respective layer. In some embodiments, the second layer, the third layer, or both may include from about 5 wt. % to about 50 wt. %, from about 5 wt. % to about 40 wt. %, from about 5 wt. % to about 20 wt. %, from about 20 wt. % to about 50 wt. %, from about 20 wt. % to about 40 wt. %, or from about 40 wt. % to about 50 wt. % low density polyethylene, based on the total weight of the respective layer.

Methods of Producing the Presently-Described Films

Various methodologies are contemplated for producing the multilayer films. In one or more embodiments, the process of manufacturing the multilayer film may include cast film extrusion or blown film extrusion.

In some embodiments, the process of manufacturing the multilayer film may include forming a blown film bubble. In some embodiments, the blown film bubble may be a multilayer blown film bubble. Further in accordance with this embodiment, the multilayer blown film bubble may include at least five layers (in accordance with the first layer, the second layer, the third layer, the fourth layer, and the fifth layer described herein), and the at least five layers may adhere to each other. In some embodiments, each of the first layer and the fifth layer may include a linear low density polyethylene, the second layer and the fourth layer may include a high density polyethylene, and the third layer may include the polyethylene composition as described previously in this disclosure.

During embodiments of the blown film process, an extruded film from an extruder die may be formed (blown) and pulled up a tower onto a nip. The film may then be wound onto a core. Before the film is wound onto the core, the ends of the film may be cut and folded using folding equipment. This makes the layers of the film difficult to separate, which may be important for shipping applications, generally, or heavy duty shipping sack applications.

In further embodiments, the blown film bubble may be formed via a blown film extrusion line having a length to diameter ("L/D") ratio of from 30 to 1. In some embodiments, the extrusion line may have a blow up ratio of from about 1 to about 5, from about 1 to about 3, from about 2 to about 5, or from about 2 to about 3. In some embodiments, the extrusion line may utilize a die with internal bubble cooling. In some embodiments, the die gap may be from about 1 millimeter (mm) to about 5 mm, from about 1 mm to about 3 mm, from about 2 mm to about 5 mm, or from about 2 mm to about 3 mm.

In some embodiments, the extrusion line may utilize a film thickness gauge scanner. In some embodiments, during the extrusion process, the multilayer film thickness may be maintained at about from about 15 μm or to 115 μm. In other embodiments, the multilayer film thickness may be maintained at about from 15 μm to 100 μm, from 15 μm to 75 μm, from 15 μm to 50 μm, from 15 μm to 25 μm, from 25 μm to 115 μm, from 25 μm to 100 μm, from 25 μm to 75 μm, from 25 μm to 50 μm, from 50 μm to 115 μm, from 50 μm to 100 μm, from 50 μm to 75 μm, from 75 μm to 115 μm, from 75 μm to 100 μm, or from 100 μm to 115 μm.

In some embodiments, the forming of the multilayer blown film bubble step may occur at a temperature of from 350 to 500° F., or from 375 to 475° F. The output speed may be from about 5 lb/hr/in to about 25 lb/hr/in, from about 5 lb/hr/in to about 20 lb/hr/in, from about 5 lb/hr/in to about 15 lb/hr/in, from about 5 lb/hr/in to about 10 lb/hr/in, from about 10 lb/hr/in to about 25 lb/hr/in, from about 10 lb/hr/in to about 20 lb/hr/in, from about 10 lb/hr/in to about 15 lb/hr/in, from about 15 lb/hr/in to about 25 lb/hr/in, from about 15 lb/hr/in to about 20 lb/hr/in, or from about 20 lb/hr/in to about 25 lb/hr/in.

Articles

Embodiments of the present disclosure also relate to articles, such as packages, formed from the multilayer films of the present disclosure. Such packages can be formed from any of the multilayer films of the present disclosure described herein. Multilayer films of the present disclosure are particularly useful in articles where good tear strength and dart strength are desired.

Examples of such articles can include flexible packages, pouches, stand-up pouches, and pre-made packages or pouches. In some embodiments, multilayer films or laminates of the present disclosure can be used for heavy duty shipping sacks. In some embodiments, one or more of the foregoing heavy duty shipping sacks may be utilized in shipping applications.

Various methods of producing embodiments of articles from the multilayer films disclosed herein would be familiar to one of ordinary skill in the art.

Polyethylene Compositions (A) Polyethylene Composition and Characterization

In one or more embodiments, the polyethylene composition may have a density of 0.924 g/cm$^3$ to 0.936 g/cm$^3$. For example, embodiments of the presently disclosed polyethylene compositions may have densities of from 0.924 g/cm$^3$ to 0.931 g/cm$^3$, from 0.924 g/cm$^3$ to 0.928 g/cm$^3$, from 0.927 g/cm$^3$ to 0.931 g/cm$^3$, or from 0.929 g/cm$^3$ to 0.933 g/cm$^3$. According to additional embodiments, the polyethylene composition may have a density of from 0.924 to 0.928, from 0.928 g/cm$^3$ to 0.932 g/cm$^3$, from 0.932 g/cm$^3$ to 0.936 g/cm$^3$, or any combination of these ranges.

In one or more embodiments, the polyethylene composition may have a melt index ($I_2$) of 0.25 g/10 minutes to 2.0 g/10 minutes, such as 0.5 g/10 minutes to 1.2 g/10 minutes. For example, in one or more embodiments, the polyethylene composition may have a melt index ($I_2$) of from 0.25 g/10 minutes to 0.5 g/10 minutes, from 0.5 g/10 minutes to 0.7 g/10 minutes, from 0.7 g/10 minutes to 0.9 g/10 minutes, from 0.59 g/10 minutes to 1.1 g/10 minutes, from 1.1 g/10 minutes to 1.3 g/10 minutes, from 1.3 g/10 minutes to 1.5 g/10 minutes, from 1.5 g/10 minutes to 1.7 g/10 minutes, from 1.7 g/10 minutes to 2.0 g/10 minutes, or any combination of these ranges. According to additional embodiments, the polyethylene composition may have a melt index ($I_2$) of from 0.65 g/10 minutes to 1.05 g/10 minutes.

According to embodiments, the polyethylene compositions may have a molecular weight distribution, expressed as the ratio of the weight average molecular weight to number average molecular weight (Mw/Mn), in the range of from 2.5 to 8.0. For example, the polyethylene composition may have a molecular weight distribution of from 2.5 to 3.0, from 3.0 to 3.5, from 3.5 to 4.0, from 4.0 to 4.5, from 4.5 to 5.0, from 5.0 to 5.5, from 5.5 to 6.0, from 6.0 to 6.5, from 6.5 to 7.0, from 7.0 to 7.5, from 7.5 to 8.0, or any combination of these ranges. In additional embodiments, the polyethylene composition may have a molecular weight distribution of from 3.0 to 5.0. As presently described, the molecular weight distribution may be calculated according to gel permeation chromatography (GPC) techniques as described herein.

According to one or more additional embodiments, the polyethylene composition may have a zero shear viscosity ratio of less than 3.0. For example, the polyethylene composition may have a zero shear viscosity ratio of less than 2.9, less than 2.8, less than 2.7, less than 2.6, less than 2.5, less than 2.4, less than 2.3, less than 2.2, less than 2.1, less than 2.0, less than 1.9, less than 1.8, less than 1.7, less than 1.6, less than 1.5, less than 1.4, less than 1.3, less than 1.2, or even less than 1.1. In one or more embodiments, the polyethylene composition may have a zero shear viscosity ratio of at least 1.0.

As described herein, a polyethylene "fraction" refers to a portion of the total composition of the polyethylene composition. The presently disclosed embodiments include at least a "first polyethylene fraction" and a "second polyethylene fraction." The various fractions included in the polyethylene composition may be quantified by their temperature range in an elution profile via improved comonomers composition distribution (iCCD) analysis method. Unless specified, any elution profile referred to herein is the elution profile observed via iCCD. Examples of such fractions will be better understood in view of the examples provided herewith. In general, the first fraction may include a single peak in the temperature range of the first fraction and the second fraction may include a single peak in the temperature range of the second fraction. The polyethylene compositions described herein may be referred to as "multimodal," meaning that they include at least two peaks in their elution profile. Some embodiments may be "bimodal," meaning that two major peaks are present.

In reference to the described iCCD distribution, FIG. 1 schematically depicts a sample iCCD distribution 100 along with the cumulative weight fraction curve 200. FIG. 1 depicts, generally, several features of the iCCD profiles of the presently described polyethylene compositions, such as the first fraction, the second fraction, half peak widths, etc., which are discussed in detail herein. As such, FIG. 1 can be used as a reference with respect to the disclosures related the iCCD profile provided herein. Specifically, the first fraction 102 and second fraction 106 are depicted. The first fraction 102 has a peak 104 and the second fraction 106 has a peak 108. Each fraction has a half peak width 110 and 112. It should be understood that the profile of FIG. 1 is not derived from experimentation or observation, but is instead supplied for informational purposes of describing particular features of an iCCD elution profile.

In one or more embodiments, the first polyethylene fraction may have a single peak in a temperature range of 45° C. to 87° C. in an elution profile via iCCD. As used herein, a "single peak" refers to an iCCD wherein a particular fraction include only a single peak. That is, in some embodiments, the iCCD of the first and second polyethylene fraction includes only an upward sloping region followed by a downward sloping region to form the single peak. In one or more embodiments, the single peak of the first polyethylene fraction may be in a temperature range of from 60° C. to 85° C., such as from 70° C. to 85° C. Without being bound by theory, it is believed that in at least some embodiments of the presently disclosed polyethylene composition where a dual reactor design is used for polymerization, a combination of higher density crystalline domain and lower density amorphous domain may exist. The impact strength is controlled predominantly by the amorphous region or the tie concentrations that connect the adjacent lamellae. The relative tie chain concentration is estimated to be relatively large when the density is less than 0.910 g/cm³. The peak of the first polymer fraction in the presently disclosed compositions may lie in the temperature range of 60° C. to 85° C., which may provide greater tie-chain concentration for functional benefits such as improved toughness.

It should be understood that a peak in the first or second polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction.

In one or more embodiments, the second polyethylene fraction may have a single peak in the temperature range of 95° C. to 120° C. in the elution profile via iCCD. The temperature range of the second polyethylene fraction of 95° C. to 120° C. may be desirable because the low molecular weight, high density component at 95° C. to 120° C. may allow the polyethylene to achieve higher overall density while maintaining a lower density fraction as described by the ratio of these two fractions.

In one or more embodiments, the width of the single peak of the second polyethylene fraction at 50 percent peak height may be less than 5.0° C., less than 4° C., or even less than 3° C. Generally, lesser temperature ranges at 50 percent peak heights correspond to a "sharper" peak. Without being bound by any particular theory, it is believed that a "sharper" or "narrower" peak is a characteristic caused by the molecular catalyst and indicates minimum comnomer incorporation on the higher density fraction, enabling higher density split between the two fractions.

In one or more embodiments, the polyethylene composition may have a local minimum in an elution profile via iCCD in a temperature range of from 80° C. to 90° C. This local minimum may fall between the peaks of the first polyethylene fraction and the second polyethylene fraction.

In embodiments described herein, the first polyethylene fraction area is the area in the elution profile between 45° C. and 87° C., beneath the single peak of the first polyethylene fraction. Similarly, the second polyethylene fraction area is the area in the elution profile between 95° C. and 120° C., beneath the single peak of the second polyethylene fraction. The first polyethylene fraction area and the second polyethylene fraction, respectively, may correspond generally with the total relative mass of each polymer fraction in the polyethylene composition.

According to one or more embodiments, the difference between the single peak of the second polyethylene fraction and the single peak of the first polyethylene fraction may be at least 10° C. For example, the difference between the single peak of the second polyethylene fraction and the single peak of the first polyethylene fraction may be at least 12° C., 14° C., 16° C., 18° C., or even at least 20° C. In general, a polyethylene fraction area in an iCCD profile may be determined by integrating the iCCD profile between the starting and ending temperatures specified.

In one or more embodiments, the first polyethylene fraction area may comprise at least 40% of the total area of the elution profile (for example, at least 42%, at least 44%, at least 46%, at least 48%, at least 50%, at least 52%, or even at least 54% of the total area of the elution profile). For example, the first polyethylene fraction area may comprise from 40% to 65% of the total area of the elution profile, such as from 42% to 58%, from 43% to 45%, from 45% to 47%, from 53% to 55%, or from 55% to 57%.

According to one or more embodiments, the second polyethylene fraction area may comprise at least 25% of the total area of the elution profile (for example, at least 30%, at least 35%, or even at least 40% of the total area of the elution profile). For example, the first polyethylene fraction area may comprise from 20% to 50%, from 27% to 31% or from 41% to 48% of the total area of the elution profile.

According to some embodiments, a ratio of the first polyethylene fraction area to the second polyethylene fraction area may be from 0.75 to 2.5 (such as 0.75 to 1.0, 1.0 to 1.25, from 1.25 to 1.5, from 1.5 to 1.75, from 1.75 to 2.0, from 2.0 to 2.25, from 2.25 to 2.5, or any combination of these ranges).

In one or more embodiments, the polyethylene composition is formed from the polymerization of ethylene and a comonomers such as a C3-C12 alkene. Contemplated comonomers include C6-C9 alkenes, such as 1-octene and 1-hexene. In one or more embodiments the comonomers is 1-octene.

In one or more embodiments, the difference between the single peak of the second polyethylene fraction and the single peak of the first polyethylene fraction is at least 10° C., at least 12.5° C. at least 15° C., at least 17.5° C., or even at least 20° C.

In one or more embodiments, the first polyethylene fraction may have a melt index ($I_2$) of 0.01 to 0.18 g/10 minutes. For example, according to one or more embodiments, the first polyethylene fraction may have a melt index ($I_2$) of from 0.01 g/10 minutes to 0.03 g/10 minutes, from 0.03 g/10 minutes to 0.05 g/10 minutes, from 0.05 g/10 minutes to 0.07 g/10 minutes, from 0.07 g/10 minutes to 0.09 g/10 minutes, from 0.09 g/10 minutes to 0.11 g/10 minutes, from 0.11 g/10 minutes to 0.13 g/10 minutes, from 0.13 g/10 minutes to 0.15 g/10 minutes, from 0.15 g/10 minutes to 0.18 g/10 minutes, or any combination of these ranges.

In one or more embodiments, the second polyethylene fraction may have a melt index ($I_2$) of 1 to 10,000 g/10 minutes. For example, according to one or more embodiments, the second polyethylene fraction may have a melt index ($I_2$) of from 10 g/10 minutes to 1,000 g/10 minutes, from 20 g/10 minutes to 800 g/10 minutes, from 1 g/10 minutes to 100 g/10 minutes, from 100 g/10 minutes to 1,000 g/10 minutes, from 1,000 g/10 minutes to 10,000 g/10 minutes, or any combination of these ranges.

In one or more embodiments, the weight average molecular weight of the second polyethylene fraction may be less than or equal to 120,000 g/mol, such as from 20,000 g/mol to 120,000 g/mol , or from 40,000 g/mol to 65,000 g/mol. In additional embodiments, the weight average molecular weight of the second polyethylene fraction may be from 20,000 g/mol to 40,000 g/mol, from 40,000 g/mol to 60,000 g/mol, from 60,000 g/mol to 80,000 g/mol, from 80,000 g/mol to 100,000 g/mol, from 100,000 g/mol to 120,000 g/mol, or any combination of these ranges. Molecular weight of the polyethylene fractions may be calculated based on GPC results, as described herein below.

The polyethylene compositions described herein may have relatively good dart strength when formed into monolayer blown films. According to one or more embodiments, a monolayer blown film formed from the polyethylene composition and having a thickness of two mils has a Dart drop impact of at least 1000 grams when measured according to ASTM D1709 Method A. In additional embodiments, a monolayer blown film formed from the polyethylene composition and having a thickness of two mils has a Dart drop impact of at least 1100 grams, at least 1200 grams, at least 1300 grams, at least 1400 grams, at least 1500 grams, at least 1600 grams, at least 1700 grams, at least 1800 grams, at least 1900 grams, or even at least 2000 grams when measured according to ASTM D1709 Method A.

According to additional embodiments, the polyethylene compositions may have Dow Rheology Index of less than or equal to 5, such as less than or equal to 4, less than or equal to 3, less than or equal to 2, or even less than or equal to 1.

In one or more embodiments, the presently disclosed polyethylene compositions may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, and combinations thereof. The polyethylene compositions may contain from about 0.1 to about 10 percent by the combined weight of such additives, based on the weight of the polyethylene composition including such additives.

(B) Polymerization

Any conventional polymerization processes may be employed to produce the polyethylene compositions described herein. Such conventional polymerization processes include, but are not limited to, slurry polymerization processes, solution polymerization process, using one or more conventional reactors, e.g., loop reactors, isothermal reactors, stirred tank reactors, batch reactors in parallel, series, and/or any combinations thereof. The polyethylene composition may, for example, be produced via solution phase polymerization process using one or more loop reactors, isothermal reactors, and combinations thereof.

In general, the solution phase polymerization process may occur in one or more well-mixed reactors such as one or more isothermal loop reactors or one or more adiabatic reactors at a temperature in the range of from 115 to 250° C. (e.g., from 115 to 210° C.), and at pressures in the range of from 300 to 1,000 psi (e.g., from 400 to 800 psi). In some embodiments, in a dual reactor, the temperature in the first reactor is in the range of from 115 to 190° C. (e.g., from 160 to 180° C.), and the second reactor temperature is in the range of 150 to 250° C. (e.g., from 180 to 220° C.). In other embodiments, in a single reactor, the temperature in the reactor is in the range of from 115 to 250° C. (e.g., from 115 to 225° C.).

The residence time in solution phase polymerization process may be in the range of from 2 to 30 minutes (e.g., from 5 to 25 minutes). Ethylene, solvent, hydrogen, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Texas. The resultant mixture of the polyethylene composition and solvent is then removed from the reactor and the polyethylene composition is isolated. Solvent is typically recovered via a solvent recovery unit, e.g., heat exchangers and vapor liquid separator drum, and is then recycled back into the polymerization system.

In some embodiments, the polyethylene composition may be produced via solution polymerization in a dual reactor system, for example a dual loop reactor system, wherein ethylene is polymerized in the presence of one or more catalyst systems. In some embodiments, only ethylene is polymerized. Additionally, one or more cocatalysts may be present. In another embodiment, the polyethylene composition may be produced via solution polymerization in a single reactor system, for example a single loop reactor system, wherein ethylene is polymerized in the presence of two catalyst systems. In some embodiments, only ethylene is polymerized.

(C) Catalyst Systems

Specific embodiments of catalyst systems that can, in one or more embodiments, be used to produce the polyethylene compositions described herein will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{40})$alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{40})$alkyl substituted with exactly one group $R^S$, where $R^S$ is phenyl (—$C_6H_5$)" may contain from 7 to 46 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or function group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless clearly specified mean the same thing.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

In this disclosure, a $(C_1-C_{40})$hydrocarbyl can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In some embodiments, each of the aforementioned $(C_1-C_{40})$hydrocarbyl groups has a maximum of 20 carbon atoms (i.e., $(C_1-C_{20})$hydrocarbyl) and other embodiments, a maximum of 12 carbon atoms.

The terms "$(C_1-C_{40})$alkyl" and "$(C_1-C_8)$alkyl" mean a saturated straight or branched hydrocarbon radical of from 1 to 40 carbon atoms or from 1 to 18 carbon atoms, respectively, that is unsubstituted or substituted by one or more $R^s$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" (with square brackets) means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of d$(C_1-C_{40})$hydrocarbylene include unsubstituted or substituted $(C_6-C_{40})$arylene, $(C_3-C_{40})$cycloalkylene, and $(C_1-C_{40})$alkylene (e.g., —$(C_1-C_{20})$alkylene). In some embodiments, the diradicals are on the same carbon atom (e.g., —CH$_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of $(C_2-C_{20})$alkylene α,ω-diradicals include ethan-1,2-diyl (i.e. —CH$_2$CH$_2$—), propan-1,3-diyl (i.e. —CH$_2$CH$_2$CH$_2$—), 2-methylpropan-1,3-diyl (i.e. —CH$_2$CH(CH$_3$)CH$_2$—). Some examples of $(C_6-C_{50})$arylene α,ω-diradicals include phenyl-1,4-diyl, napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$), in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis (methylene)bicyclo [2.2.2] octane.

The term "$(C_3-C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), S(O)$_2$, Si(R$^C$)$_2$, P(R$^P$), N(R$^N$), —N=C(R$^C$)$_2$, —Ge(R$^C$)$_2$—, or —Si(R$^C$)—, where each $R^C$, each $R^N$, and each $R^P$ is unsubstituted $(C_1-C_{18})$hydrocarbyl or —H. The term "heterohydrocarbon" refers to a molecule or molecular framework in which one or more carbon atoms are replaced with a heteroatom. The term "$(C_1-C_{40})$heterohydrocarbyl" means a heterohydrocarbon radical of from 1 to 40 carbon atoms and the term "$(C_1-C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The (C$_1$-C$_{40}$)heterohydrocarbyl may be unsubstituted or substituted (C$_1$-C$_{40}$)heteroalkyl, (C$_1$-C$_{40}$)hydrocarbyl-O—, (C$_1$-C$_{40}$)hydrocarbyl-S—, (C$_1$-C$_{40}$)hydrocarbyl-S(O)—, (C$_1$-C$_{40}$)hydrocarbyl-S(O)$_2$—, (C$_1$-C$_{40}$)hydrocarbyl-Si(R$^C$)$_2$—, (C$_1$-C$_{40}$)hydrocarbyl-N(R$^N$)—, (C$_1$-C$_{40}$)hydrocarbyl-P(R$^P$)—, (C$_2$-C$_{40}$)heterocycloalkyl, (C$_2$-C$_{19}$)heterocycloalkyl-(C$_1$-C$_{20}$)alkylene, (C$_3$-C$_{20}$)cycloalkyl-(C$_1$-C$_{19}$)heteroalkylene, (C$_2$-C$_{19}$)heterocycloalkyl-(C$_1$-C$_{20}$)heteroalkylene, (C$_1$-C$_{40}$)heteroaryl, (C$_1$-C$_{19}$)heteroaryl-(C$_1$-C$_{20}$)alkylene, (C$_6$-C$_{20}$)aryl-(C$_1$-C$_{19}$)heteroalkylene, or (C$_1$-C$_{19}$)heteroaryl-(C$_1$-C$_{20}$)heteroalkylene.

The term "(C$_4$-C$_{40}$)heteroaryl" means an unsubstituted or substituted (by one or more R$^d$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., (C$_x$-C$_y$)heteroaryl generally, such as (C$_4$-C$_{12}$)heteroaryl) are defined in an analogous manner as having from x to y carbon atoms (such as 4 to 12 carbon atoms) and being unsubstituted or substituted by one or more than one R$^s$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing (C$_1$-C$_{50}$) carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include Si(R$^C$)$_3$, Ge(R$^C$)$_3$, Si(R$^C$)$_2$, Ge(R$^C$)$_2$, P(R$^P$)$_2$, P(R$^P$), N(R$^N$)$_2$, N(R$^N$), N, O, OR$^C$, S, SR$^C$, S(O), and S(O)$_2$, wherein each of the heteroalkyl and heteroalkylene groups are unsubstituted or substituted by one or more R$^S$.

Examples of unsubstituted (C$_2$-C$_{40}$)heterocycloalkyl are unsubstituted (C$_2$-C$_{20}$)heterocycloalkyl, unsubstituted (C$_2$-C$_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F$^-$), chloride (Cl$^-$), bromide (Br$^-$), or iodide (I$^-$).

The term "saturated" means lacking carbon-carbon double bonds, carbon-carbon triple bonds, and (in heteroatom-containing groups) carbon-nitrogen, carbon-phosphorous, and carbon- silicon double bonds. Where a saturated chemical group is substituted by one or more substituents R$^S$, one or more double and/or triple bonds optionally may or may not be present in substituents R$^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents R$^S$, if any, or in (hetero) aromatic rings, if any.

According to some embodiments, a catalyst system for producing a polyethylene composition includes a metal-ligand complex according to formula (I):

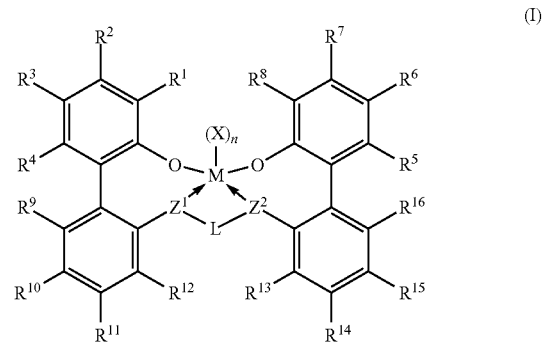

(I)

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N(R$^N$)—, or —P(R$^P$)—; L is (C$_1$-C$_{40}$)hydrocarbylene or (C$_1$-C$_{40}$)heterohydrocarbylene, wherein the (C$_1$-C$_{40}$)hydrocarbylene has a portion that comprises a 1-carbon atom to 10-carbon atom linker backbone linking the two Z groups in Formula (I) (to which L is bonded) or the (C$_1$-C$_{40}$)heterohydrocarbylene has a portion that comprises a 1-atom to 10-atom linker backbone linking the two Z groups in Formula (I), wherein each of the 1 to 10 atoms of the 1-atom to 10-atom linker backbone of the (C$_1$-C$_{40}$)heterohydrocarbylene independently is a carbon atom or heteroatom, wherein each heteroatom independently is O, S, S(O), S(O)$_2$, Si(R$^C$)$_2$, Ge(R$^C$)$_2$, P(R$^C$)s or N(R$^C$), wherein independently each R$^C$ is (C$_1$-C$_{30}$)hydrocarbyl or (C$_1$-C$_{30}$)heterohydrocarbyl; R$^1$ and R$^8$ are independently selected from the group consisting of —H, (C$_1$-C$_{40}$)hydrocarbyl, (C$_1$-C$_{40}$)heterohydrocarbyl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)-, $_{R}$C$_s$($_o$)$_2$-, ($_R$C)$_2$C=N—, R$^C$C(O)O—, R$^C$OC(O)—, R$^C$C(O)N(R$^N$)—, ($R^N$)$_2$NC(O)—, halogen, and radicals having formula (II), formula (III), or formula (IV):

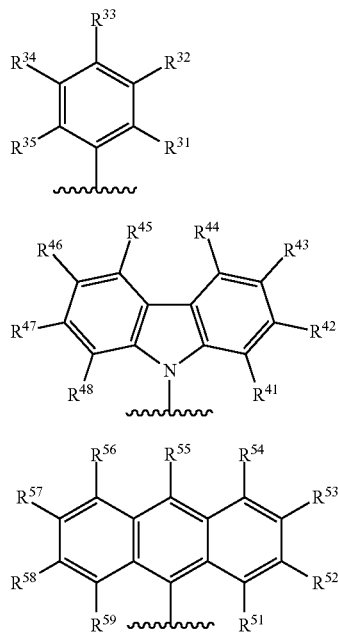

(II)
(III)
(IV)

In formulas (II), (III), and (IV), each of $R^{31-35}$, $R^{41-48}$, or $R^{51-59}$ is independently chosen from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, or —H, provided at least one of $R^1$ or $R^8$ is a radical having formula (II), formula (III), or formula (IV).

In formula (I), each of $R^{2-4}$, $R^{5-7}$, and $R^{9-16}$ is independently selected from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —NO$_2$, —CN, —CF$_3$, $R^C$S(O)—, $R^C$S(O)$_2$, ($R^C$)$_2$C=N—, $R^C$C(O)O—, $R^C$OC(O)—, $R^C$C(O)N($R^N$)—, ($R^N$)$_2$NC(O)—, halogen, and —H.

In some embodiments, the polyethylene composition is formed using a first catalyst according to formula (I) in a first reactor and a different catalyst according to formula (I) in a second reactor.

In one exemplary embodiment where a dual loop reactor is used, the procatalyst used in the first loop is zirconium, [[2,2'''-[[bis[1-methylethyl)germylene]bis(methyleneoxy-κO)]bis[3'',5,5''-tris(1,1-dimethylethyl)-5'-octyl[1,1':3',1''-terphenyl]-2'-olato-κO]](2-)]dimethyl-, having the chemical formula $C_{86}H_{128}F_2GeO_4Zr$ and the following structure (V):

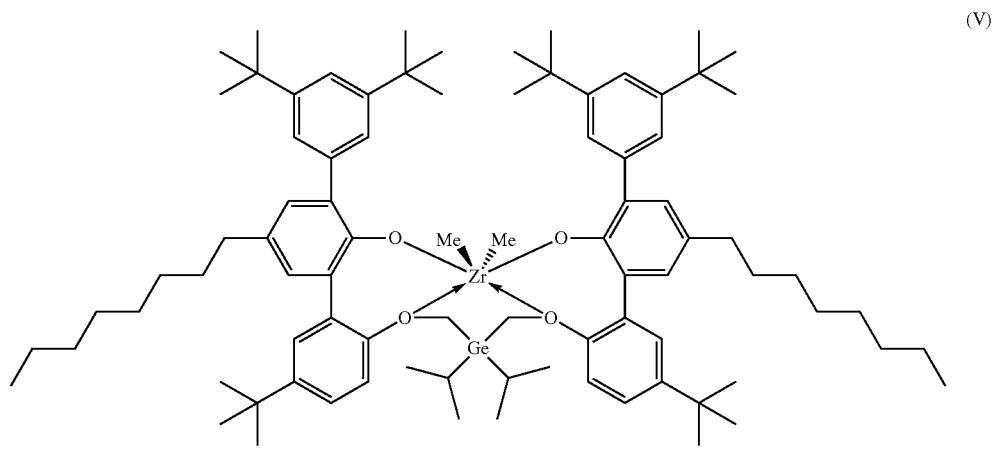

(V)

In such an embodiment, the procatalyst used in the second loop is zirconium, [[2,2'''-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1']-biphenyl]-2-olato-κO]](2-)]dimethyl, having the chemical formula $C_{107}H_{154}N_2O_4Si_2Zr$ and the following structure (VI):

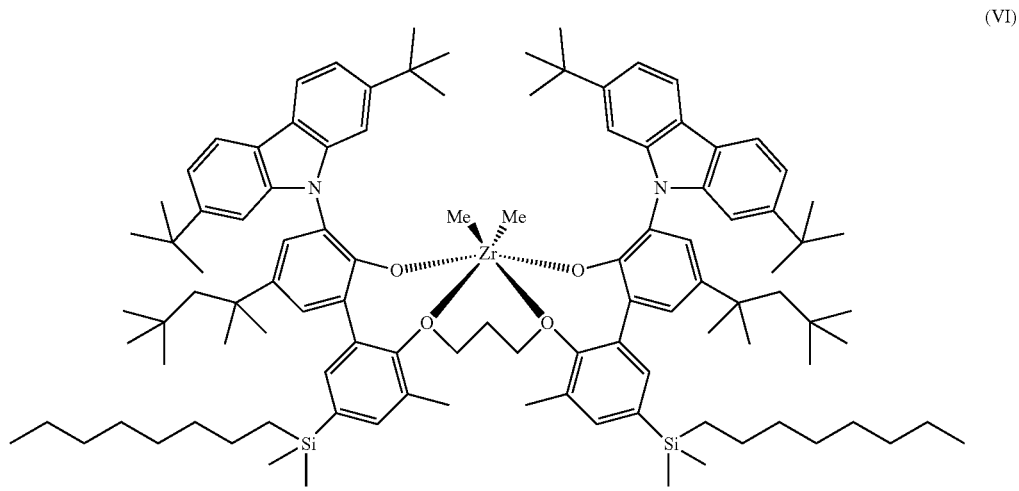

(VI)

(D) Co-Catalyst Component

The catalyst system comprising a metal-ligand complex of formula (I) may be rendered catalytically active by any technique known in the art for activating metal-based catalysts of olefin polymerization reactions. For example, the system comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 $(C_1-C_{20})$hydrocarbyl substituents as described herein. In one embodiment, Group 13 metal compounds are tri$(C_1-C_{20})$hydrocarbyl)-substituted-aluminum or tri$(C_1-C_{20})$hydrocarbyl)-boron compounds. In other embodiments, Group 13 metal compounds are tri(hydrocarbyl)-substituted-aluminum, tri$(C_1-C_{20})$hydrocarbyl)-boron compounds, tri$(C_1-C_{10})$alkyealuminum, tri$(C_6-C_{18})$aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris$(C_1-C_{20})$hydrocarbyl borate (e.g. trityl tetrafluoroborate) or a tri$(C_1-C_{20})$hydrocarbyl) ammonium tetra$(C_1-C_{20})$hydrocarbyeborane (e.g. bis(octadecyl)methylammonium tetrakis (pentafluorophenyl)borane). As used herein, the term "ammonium" means a nitrogen cation that is a $(C_1-C_{20})$hydrocarbyl)$_4$N$^+$ a $(C_1-C_{20})$hydrocarbyl)$_3$N(H)$^+$, a $(C_1-C_{20})$hydrocarbyl)$_2$N(H)$_2^+$, $(C_1-C_{20})$hydrocarbylN(H)$_3^+$, or N(H)$_4^+$, wherein each $(C_1-C_{20})$hydrocarbyl, when two or more are present, may be the same or different.

Combinations of neutral Lewis acid activators (co-catalysts) include mixtures comprising a combination of a tri$(C_1-C_4)$alkyealuminum and a halogenated tri$(C_6-C_{18})$aryl)boron compound, especially a tris(pentafluorophenyl)borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex) : (tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate(1$^-$) amine, and combinations thereof.

In some embodiments, one or more of the foregoing activating co-catalysts are used in combination with each other. An especially preferred combination is a mixture of a tri$(C_1-C_4)$hydrocarbyealuminum, tri$(C_1-C_4)$hydrocarbyeborane, or an ammonium borate with an oligomeric or polymeric alumoxane compound. The ratio of total number of moles of one or more metal-ligand complexes of formula (I)

to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal—ligand complexes of formula (I) from 0.5: 1 to 10:1, from 1:1 to 6:1, or from 1:1 to 5:1. The remaining activating co-catalysts are generally employed in approximately mole quantities equal to the total mole quantities of one or more metal-ligand complexes of formula (I).

TEST METHODS

The test methods include the following:

Melt index

Melt indices I2 (or I2) and Iio (or I10) of polymer samples were measured in accordance to ASTM D-1238 (method B) at 190° C. and at 2.16 kg and 10 kg load, respectively. Their values are reported in g/10 min. Fractions of polymer samples were measured by collecting product polymer from the reactor which produces that specific fraction or portion of the polymer composition. For example, the first polyethylene fraction can be collected from the reactor producing the lower density, higher molecular weight component of the polymer composition. The polymer solution is dried under vacuum before the melt index measurement.

Density

Samples for density measurement were prepared according to ASTM D4703. Measurements were made, according to ASTM D792, Method B, within one hour of sample pressing.

ASTM D1709 Dart Drop

The film Dart Drop test determines the energy that causes plastic film to fail under specified conditions of impact by a free falling dart. The test result is the energy, expressed in terms of the weight of the missile falling from a specified height, which would result in failure of 50% of the specimens tested.

After the film is produced, it is conditioned for at least 40 hours at 23° C. (+/−2° C.) and 50% R.H (+/−5) as per ASTM standards. Standard testing conditions are 23° C. (+/−2° C.) and 50% R.H (+/−5) as per ASTM standards.

The test result can be reported by Method A, which uses a 1.5" diameter dart head and 26" drop height or Method B, which uses a 2.0 diameter dart head and 60" drop height. The sample thickness is measured at the sample center and the sample then clamped by an annular specimen holder with an inside diameter of 5 inches. The dart is loaded above the center of the sample and released by either a pneumatic or electromagnetic mechanism.

Testing is carried out according to the 'staircase' method. If the sample fails, a new sample is tested with the weight of the dart reduced by a known and fixed amount. If the sample does not fail, a new sample is tested with the weight of the dart increased by a known amount. After 20 specimens have been tested the number of failures is determined. If this number is 10 then the test is complete. If the number is less than 10 then the testing continues until 10 failures have been recorded. If the number is greater than 10, testing is continued until the total of non-failures is 10. The Dart drop strength is determined from these data as per ASTM D1709 and expressed in grams as the dart drop impact of Type A. All the samples analyzed were 2 mil thick.

Instrumented Dart Impact

Instrumented dart impact method is measured according to ASTM D7192 on plastic film specimens using an Instron CEAST 9350 impact tester. The test is conducted using 12.7 mm diameter tup with hemispherical head, 75 mm diameter clamping assembly with rubber faced grips. The instrument is equipped with an environmental chamber for testing at low or high temperature. Typical specimen size is 125 mm×125 mm. Standard test velocity is 200 m/min. Film thickness is 2 mil.

Creep Zero Shear Viscosity Measurement Method

Zero-shear viscosities are obtained via creep tests that were conducted on an AR-G2 stress controlled rheometer (TA Instruments; New Castle, Del) using 25-mm-diameter parallel plates at 190° C. The rheometer oven is set to test temperaturea for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ $s^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of $\epsilon$ vs. t, where $\epsilon$ is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Gel Permeation Chromatoraphv (GPC)

The chromatographic system consisted of a PolymerChar GPC-IR (Valencia, Spain) high temperature GPC chromatograph equipped with an internal IR5 infra-red detector (IR5). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)).:

$$M_{polyethylene} = A \times (M_{polystyrene})^B \quad \text{(EQ 1)}$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at 120,000 Mw.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\,Max})}{\text{Peak Width at } \frac{1}{2} \text{ height}} \right)^2 \quad \text{(EQ 2)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\,tenth\,height} - RV_{Peak\,max})}{(RV_{Peak\,max} - \text{Front Peak } RV_{one\,tenth\,height})} \quad \text{(EQ 3)}$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i / M_{polyethyene_i})} \quad \text{(EQ 4)}$$

$$Mw_{(GPC)} = \frac{\sum_i (IR_i * M_{polyethyene_i})}{\sum_i IR_i} \quad \text{(EQ 5)}$$

$$Mz_{(GPC)} = \frac{\sum_i (IR_i * M_{polyethyene_i}^2)}{\sum_i (IR_i * M_{polyethyene_i})} \quad \text{(EQ 6)}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−0.5% of the nominal flowrate.

Flowrate(effective)=Flowrate(nominal)*(RV(FM Calibrated)/RV(FM Sample)) (EQ 7)

Improved Method for Comonomer Content Analysis (iCCD)

Improved method for comonomer content analysis (iCCD) was developed in 2015 (Cong and Parrott et al., WO2017040127A1). iCCD test was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 5 cm or 10 cm (length)×¼" (ID) stainless was installed just before IR-5 detector in the detector oven. Ortho-dichlorobenzene (ODCB, 99% anhydrous grade or technical grade) was used. Silica gel 40 (particle size 0.2~0.5 mm, catalogue number 10181-3) from EMD Chemicals was obtained (can be used to dry ODCB solvent before). The CEF instrument is equipped with an autosampler with N2 purging capability. ODCB is sparged with dried nitrogen (N2) for one hour before use. Sample preparation was done with autosampler at 4 mg/ml (unless otherwise specified) under shaking at 160° C. for 1 hour. The injection volume was 3000. The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length)×¼" (ID) stainless tubing. The column packing and conditioning were with a slurry method according to the reference (Cong, R.; Parrott, A.; Hollis, C.; Cheatham, M. WO2017040127A1). The final pressure with TCB slurry packing was 150 Bars.

Column temperature calibration was performed by using a mixture of the Reference Material Linear homopolymer polyethylene (having zero comonomer content, Melt index ($I_2$) of 1.0, polydispersity $M_w/M_n$ approximately 2.6 by conventional gel permeation chromatography, 1.0 mg/ml) and Eicosane (2 mg/ml) in ODCB. iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL. The reported elution peak temperatures were linearly fit to the linear equation y=−6.3515x.+101.00, where y represented elution temperature of iCCD and x represented the octene mole%, and $R^2$ was 0.978.

Molecular weight of polymer and the molecular weight of the polymer fractions was determined directly from LS detector (90 degree angle) and concentration detector (IR-5) according Rayleigh-Gans-Debys approximation (Striegel and Yau, Modern Size Exclusion Liquid Chromatogram, Page 242 and Page 263) by assuming the form factor of 1 and all the virial coefficients equal to zero. Integration windows are set to integrate all the chromatograms in the elution temperature (temperature calibration is specified above) range from 23.0 to 120° C.

The calculation of Molecular Weight (Mw) from iCCD includes the following four steps:

(1) Measuring the interdetector offset. The offset is defined as the geometric volume offset between LS with respect to concentration detector. It is calculated as the difference in the elution volume (mL) of polymer peak between concentration detector and LS chromatograms. It is converted to the temperature offset by using elution thermal rate and elution flow rate. A linear high density polyethylene (having zero comonomer content, Melt index ($I_2$) of 1.0, polydispersity $M_w/M_n$ approximately 2.6 by conventional gel permeation chromatography) is used. Same experimental conditions as the normal iCCD method above are used except the following parameters: crystallization at 10° C./min from 140° C. to 137° C., the thermal equilibrium at 137° C. for 1 minute as Soluble Fraction Elution Time, soluble fraction (SF) time of 7 minutes, elution at 3° C./min from 137° C. to 142° C. The flow rate during crystallization is 0.0 ml/min. The flow rate during elution is 0.80 ml/min. Sample concentration is 1.0 mg/ml.

(2) Each LS datapoint in LS chromatogram is shifted to correct for the interdetector offset before integration.

(3) Baseline subtracted LS and concentration chromatograms are integrated for the whole eluting temperature range of the Step (1). The MW detector constant is calculated by using a known MW HDPE sample in the range of 100,000 to 140,000Mw and the area ratio of the LS and concentration integrated signals.

(4) Mw of the polymer was calculated by using the ratio of integrated light scattering detector (90 degree angle) to the concentration detector and using the MW detector constant.

Calculation of half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C.

Zero-Shear Viscosity Ratio (ZSVR)

ZSVR is defined as the ratio of the zero-shear viscosity (ZSV) of the branched polyethylene material to the ZSV of the linear polyethylene material at the equivalent weight average molecular weight (Mw-gpc) according to the following Equations (EQ) 10 and 11:

$$ZSVR = \frac{\eta_{0B}}{\eta_{0L}} \quad \text{(EQ 10)}$$

$$\eta_{0L} = 2.29 \times 10^{-15} M_{w-gpc}^{3.65} \quad \text{(EQ 11)}$$

The ZSV value is obtained from creep test at 190° C. via the method described above. The Mw-gpc value is determined by the conventional GPC method (Equation 5 in the Conventional GPC method description). The correlation between ZSV of linear polyethylene and its Mw-gpc was established based on a series of linear polyethylene reference materials. A description for the ZSV-Mw relationship can be found in the ANTEC proceeding: Karjala, Teresa P., Sammler, Robert L., Mangnus, Marc A., Hazlitt, Lonnie G., Johnson, Mark S., Hagen, Charles M. Jr., Huang, Joe W. L., Reichek, Kenneth N., "Detection of low levels of long-chain branching in polyolefins", Annual Technical Conference—Society of Plastics Engineers (2008), 66th 887-891.

MD Tear

MD Tear was measured according to ASTM D-1922. The force in grams required to propagate tearing across a film specimen is measured using a Elmendorf Tear tester. Acting by gravity, the pendulum swings through an arc, tearing the specimen from a precut slit. The tear is propagated in the cross direction. Samples are conditioned for a minimum of 40 hours at temperature prior to testing Dynamic Rheological Analysis To characterize the rheological behavior of substantially linear ethylene polymers, S Lai and G. W. Knight introduced (ANTEC '93 Proceedings, Insite™ Technology Polyolefins (ITP)-New Rules in the Structure/Rheology Relationship of Ethylene &-Olefin Copolymers, New Orleans, La., May 1993) a new rheological measurement, the Dow Rheology Index (DRI) which expresses a polymer's "normalized relaxation time as the result of long chain branching". S. Lai et al; (ANTEC '94, Dow Rheology Index (DRI) for Insite™ Technology Polyolefins (ITP): Unique structure-Processing Relationships, pp. 1814-1815) defined the DRI as the extent to which the rheology of ethylene-octene copolymers known as ITP (Dow's Insite Technology Polyolefins) incorporating long chain branches into the polymer backbone deviates from the rheology of the conventional linear homogeneous polyolefins that are reported to have no Long Chain Branches (LCB) by the following normalized equation:

$$DRI=[3650000\times(\tau_0/\eta_0)-1]/10$$

wherein $\tau_0$ is the characteristic relaxation time of the material and is the zero shear rate complex viscosity of the material. The DRI is calculated by least squares fit of the rheological curve (dynamic complex viscosity $\eta^*(\omega)$ versus applied frequency ($\omega$) e.g., 0.01-100 rads/s) as described in U.S. Pat. No. 6,114,486 with the following generalized Cross equation, i.e.

$$\eta^*(\omega)=\eta_0/[1+(\omega\cdot\tau_0)^n]$$

wherein n is the power law index of the material, $\eta^*(\omega)$ and $\omega$ are the measured complex viscosity and applied frequency data respectively.

Dynamic rheological measurements are carried out, according to ASTM D4440, on a dynamic rheometer (e.g., ARES rheometer by TA Instruments) with 25 mm diameter parallel plates in a dynamic mode under an inert atmosphere. For all experiments, the rheometer has been thermally stable at 190° C. for at least 30 minutes before inserting the appropriately stabilized (with anti-oxidant additives), compression-moulded sample onto the parallel plates. The plates are then closed with a positive normal force registered on the meter to ensure good contact. After about 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for about 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

The values of storage (or elastic) modulus, loss (or viscous) modulus (G"), complex modulus (G*), complex viscosity (re) and tan δ (the ratio of loss modulus and storage modulus, G"/G') were obtained as a function of frequency ($\omega$) at a given temperature (e.g., 190° C.).

ASTM D882 MD and CD, 1% and 2% Secant Modulus

The film MD (Machine Direction) and CD (Cross Direction) secant modulus was determined per ASTM D882. The reported secant modulus value was the average of five measurements.

Puncture Strength

The Puncture test determines the resistance of a film to the penetration of a probe, at a standard low rate, a single test velocity. The puncture test method is based on ASTM D5748. After film production, the film was conditioned for at least 40 hours at 23° C. (+/−2° C.) and 50% R.H (+/−5), as per ASTM standards. Standard testing conditions are 23° C. (+/−2° C.) and 50% R.H (+/−5) as per ASTM standards. Puncture was measured on a tensile testing machine. Square specimens were cut from a sheet, to a size of "6 inches by 6 inches." The specimen was clamped in a "4 inch diameter" circular specimen holder, and a puncture probe was pushed into the centre of the clamped film, at a cross head speed of 10 inches/minute. The internal test method follows ASTM D5748, with one modification. It deviated from the ASTM D5748 method, in that the probe used, was a "0.5 inch diameter" polished steel ball on a "0.25 inch" support rod (rather than the 0.75 inch diameter, pear shaped probe specified in D5748).

There was a "7.7 inch" maximum travel length to prevent damage to the test fixture. There was no gauge length; prior to testing, the probe was as close as possible to, but not touching the specimen. A single thickness measurement was made in the centre of the specimen. For each specimen, the maximum force, the force at break, the penetration distance, and the energy to break were determined. A total of five specimens were tested to determine an average puncture value. The puncture probe was cleaned using a "Kim-wipe" after each specimen.

EXAMPLES

The following examples illustrate features of the present disclosure but are not intended to limit the scope of the disclosure. The following experiments analyzed the performance of embodiments of the multilayer films described herein.

Example 1A

Preparation of Polyethylene Compositions 1-5

Polyethylene Compositions 1-5, which are described according to the one or more embodiments of the detailed description, were prepared by a method and utilizing the catalysts and reactors described below.

All raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

Figure 3:
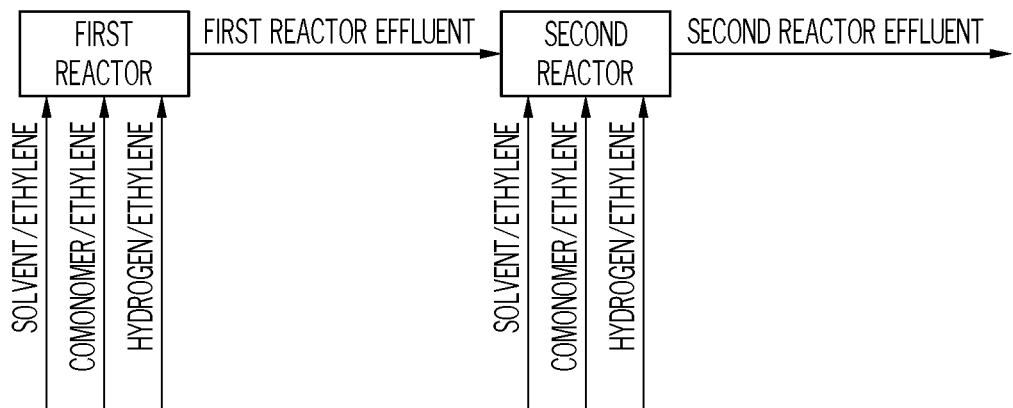
FIG. 3 schematically depicts a reactor system useful for producing polyethylene, according to one or more embodiments presently described.

A two reactor system is used in a series configuration, as is depicted in FIG. 3. Each continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to each reactor (solvent, monomer, comonomer, and hydrogen) is temperature controlled to maintain a single solution phase by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into the polymerization reactor through injection stingers. The primary catalyst component feed is computer controlled to maintain each reactor monomer conversion at the specified targets. The cocatalyst components are fed based on calculated specified molar ratios to the primary catalyst component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

In dual series reactor configuration the effluent from the first polymerization reactor (containing solvent, monomer, comonomer, hydrogen, catalyst components, and polymer) exits the first reactor loop and is added to the second reactor loop.

The second reactor effluent enters a zone where it is deactivated with the addition of and reaction with a suitable reagent (water). At this same reactor exit location other additives are added for polymer stabilization (typical antioxidants suitable for stabilization during extrusion and film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process.

The reactor stream feed data flows that correspond to the values in Table 1 used to produced the example are graphically described in FIG. 3. The data are presented such that the complexity of the solvent recycle system is accounted for and the reaction system can be treated more simply as a once through flow diagram. Table 1B shows the catalysts referenced in Table 1A.

TABLE 1A

| | | Polyethylene Composition | | | | |
|---|---|---|---|---|---|---|
| | | Polyethylene Composition 1 | Polyethylene Composition 2 | Polyethylene Composition 3 | Polyethylene Composition 4 | Polyethylene Composition 5 |
| Reactor Configuration | Type | Dual Series | Dual Series | Dual Series | Dual Series | Dual Series |
| Comonomer type | Type | 1-octene | 1-octene | 1-octene | 1-octene | 1-octene |
| First Reactor Feed Solvent/Ethylene Mass Flow Ratio | g/g | 5.2 | 5.3 | 6.6 | 5.2 | 5.3 |
| First Reactor Feed Comonomer/Ethylene Mass Flow Ratio | g/g | 0.31 | 0.31 | 0.32 | 0.31 | 0.30 |
| First Reactor Feed Hydrogen/Ethylene Mass Flow Ratio | g/g | 7.9E−05 | 6.3E−05 | 6.2E−05 | 8.9E−05 | 5.4E−05 |
| First Reactor Temperature | °C. | 175 | 175 | 170 | 175 | 175 |
| First Reactor Pressure | barg | 50 | 50 | 50 | 50 | 50 |
| First Reactor Ethylene Conversion | % | 86.7 | 91.0 | 91.0 | 86.7 | 90.9 |
| First Reactor Catalyst Type | Type | Catalyst Component 1 | Catalyst Component 1 | Catalyst Component 1 | Catalyst Component 1 | Catalyst Component 1 |
| First Reactor Co-Catalyst 1 Type | Type | Co-Catalyst 1 | Co-Catalyst 1 | Co-Catalyst 1 | Co-Catalyst 1 | Co-Catalyst 1 |
| First Reactor Co-Catalyst 2 Type | Type | Co-Catalyst 2 | Co-Catalyst 2 | Co-Catalyst 2 | Co-Catalyst 2 | Co-Catalyst 2 |
| First Reactor Catalyst Metal | Type | Zr | Zr | Zr | Zr | Zr |
| First Reactor Co-Catalyst 1 to Catalyst Molar Ratio (B to Zr ratio) | Ratio | 2.4 | 1.1 | 1.2 | 1.5 | 1.5 |
| First Reactor Co-Catalyst 2 to Catalyst Molar Ratio (Al to Zr ratio) | Ratio | 23.7 | 55.0 | 45.0 | 15.8 | 11.5 |

TABLE 1A-continued

|  |  | Polyethylene Composition 1 | Polyethylene Composition 2 | Polyethylene Composition 3 | Polyethylene Composition 4 | Polyethylene Composition 5 |
|---|---|---|---|---|---|---|
| First Reactor Residence Time | min | 7.8 | 8.5 | 9.0 | 8.0 | 8.5 |
| Second Reactor Feed Solvent/Ethylene Mass Flow Ratio | g/g | 2.4 | 2.1 | 2.5 | 2.5 | 2.1 |
| Second Reactor Feed Comonomer/Ethylene Mass Flow Ratio | g/g | 0.148 | 0.068 | 0.063 | 0.086 | 0.061 |
| Second Reactor Feed Hydrogen/Ethylene Mass Flow Ratio | g/g | 3.3E−04 | 1.1E−03 | 3.1E−04 | 3.1E−04 | 1.1E−03 |
| Second Reactor Temperature | °C. | 200 | 200 | 200 | 200 | 200 |
| Second Reactor Pressure | barg | 51 | 50 | 50 | 50 | 50 |
| Second Reactor Ethylene Conversion | % | 85.1 | 74.2 | 88.0 | 85.0 | 84.2 |
| Second Reactor Catalyst Type | Type | Catalyst Component 2 | Catalyst Component 2 | Catalyst Component 2 | Catalyst Component 2 | Catalyst Component 2 |
| Second Reactor Co-Catalyst 1 Type | Type | Co-Catalyst 1 | Co-Catalyst 1 | Co-Catalyst 1 | Co-Catalyst 1 | Co-Catalyst 1 |
| Second Reactor Co-Catalyst 2 Type | Type | Co-Catalyst 2 | Co-Catalyst 2 | Co-Catalyst 2 | Co-Catalyst 2 | Co-Catalyst 2 |
| Second Reactor Catalyst Metal | Type | Zr | Zr | Zr | Zr | Zr |
| Second Reactor Co-Catalyst 1 to Catalyst Molar Ratio (B to Metal ratio) | mol/mol | 1.1 | 10.0 | 6.7 | 13.3 | 17.1 |
| Second Reactor Co-Catalyst 2 to Catalyst Molar Ratio (Al to Metal ratio) | mol/mol | 1443.4 | >100.0 | >100.0 | >100.0 | >100.0 |
| Second Reactor Residence Time | min | 5.6 | 5.7 | 5.4 | 5.6 | 5.7 |
| Percentage of Total Ethylene Feed to First Reactor | wt % | 56.9 | 52.4 | 41.5 | 56.9 | 52.5 |

TABLE 1B

| | |
|---|---|
| Catalyst component 1 | Zirconium, dimethyl[[2,2′′′-[[bis[1-methylethyl)germylene]bis(methyleneoxy-kO)]bis[3′′,5,5′′-tris(1,1-dimethylethyl)-5′-octyl[1,1′: 3′,1′′-terphenyl]-2′-olato-kO]](2-)] |
| Catalyst component 2 | Zirconium, dimethyl[[2,2′′′-[1,3-propanediylbis(oxy-kO)]bis[3-[2,7-bis(1,1-dimethylethyl)-9H-carbazol-9-yl]]-5′-(dimethyloctylsilyl)-3′-methyl-5-(1,1,3,3-tetramethylbutyl)[1,1]-biphenyl]-2-olato-kO]](2-)]- |
| Catalyst component 3 | Hafnium, [[2′,2′′′-[1,2-cyclohexanediylbis(methyleneoxy-.kappa.O)]bis[3-(9H-carbazol-9-yl)-5-methyl[1,1′-biphenyl]-2-olato-.kappa.O]](2-)]dimethyl- |
| Catalyst component 4 | Catalyst component 4 comprised a Ziegler-Natta type catalyst). The heterogeneous Ziegler-Natta type catalyst-premix was prepared substantially according to U.S. Pat. No. 4,612,300, by sequentially adding to a volume of ISOPARE, a slurry of anhydrous magnesium chloride in ISOPAR E, a solution of EtAlCl2 in heptane, and a solution of Ti(O—iPr)4 in heptane, to yield a composition containing a magnesium concentration of 0.20M, and a ratio of Mg/Al/Ti of 40/12.5/3. An aliquot of this composition was further diluted with ISOPAR-E, to yield a final concentration of 500 ppm Ti in the slurry. While being fed to, and prior to entry into, the polymerization reactor, the catalyst premix was contacted with a dilute solution of Et3Al, in the molar Al to Ti ratio specified in Table XX, to give the active catalyst. |
| Co-catalyst 1 | bis(hydrogenated tallow alkyl)methylammonium tetrakis(pentafluorophenyl)borate(1-) |
| Co-catalyst 2 | modified methyl aluminoxane |
| Co-catalyst 3 | Tri-ethyl aluminum |

Example 1B

Preparation of Polyethylene Composition 6

Polyethylene Compositions 6 and 7, which are described according to the one or more embodiments of the detailed description, were prepared by a method and utilizing the catalysts and reactors described below.

All raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

A two reactor system is used in a parallel configuration. Each continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to each reactor (solvent, monomer, comonomer, and hydrogen) is temperature controlled to maintain a single solution phase by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into the polymerization reactor through a specially designed injection stingers. The primary catalyst component feed is computer controlled to maintain each reactor monomer conversion at the specified targets. The cocatalyst components are fed based on calculated specified molar ratios to the primary catalyst component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

The effluent streams from the first and the second polymerization reactors are combined prior to any additional processing. This final combined reactor effluent enters a zone where it is deactivated with the addition of and reaction with a suitable reagent (water). At this same reactor exit location other additives are added for polymer stabilization (typical antioxidants suitable for stabilization during extrusion and blown film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process.

Figure 4:
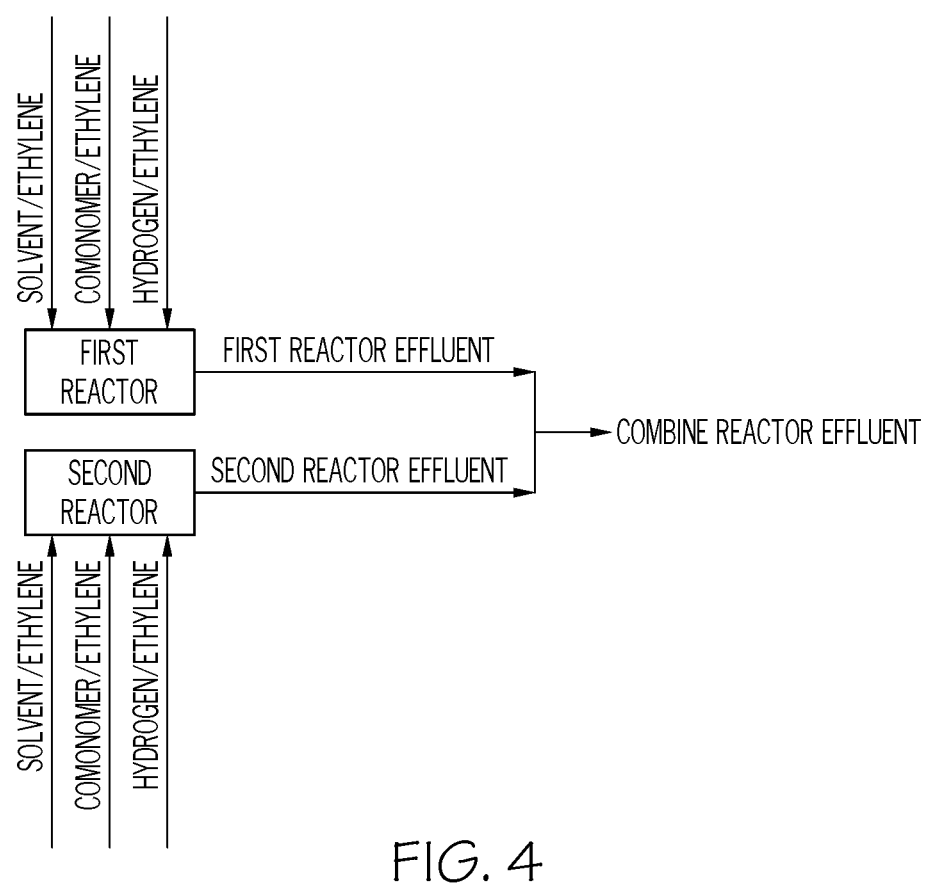
FIG. 4 schematically depicts another reactor system useful for producing polyethylene, according to one or more embodiments presently described.

The reactor stream feed data flows that correspond to the values in Table 2A used to produce the example are graphically described in FIG. 4. The data are presented such that the complexity of the solvent recycle system is accounted for and the reaction system can be treated more simply as a once through flow diagram. Table 1B shows the catalysts referenced in Table 2A of Example 1A.

TABLE 2A

|  |  | Polyethylene Composition<br>Polyethylene Composition 6 |
|---|---|---|
| Reactor Configuration | Type | Dual Parallel |
| Comonomer type | Type | 1-octene |
| First Reactor Feed Solvent/Ethylene Mass Flow Ratio | g/g | 10.4 |
| First Reactor Feed Comonomer/Ethylene Mass Flow Ratio | g/g | 0.33 |
| First Reactor Feed Hydrogen/Ethylene Mass Flow Ratio | g/g | 6.6E−05 |
| First Reactor Temperature | ° C. | 160 |
| First Reactor Pressure | barg | 50 |
| First Reactor Ethylene Conversion | % | 90.6 |
| First Reactor Catalyst Type | Type | Catalyst component 1 |
| First Reactor Co-Catalyst 1 Type | Type | Co-catalyst 1 |
| First Reactor Co-Catalyst 2 Type | Type | Co-catalyst 2 |
| First Reactor Catalyst Metal | Type | Zr |
| First Reactor Co-Catalyst 1 to Catalyst Molar Ratio (B to Metal ratio) | Ratio | 2.0 |
| First Reactor Co-Catalyst 2 to Catalyst Molar Ratio (Al to Metal ratio) | Ratio | 46.7 |
| First Reactor Residence Time | min | 7.7 |
| Second Reactor Feed Solvent/Ethylene Mass Flow Ratio | g/g | 2.5 |
| Second Reactor Feed Comonomer/Ethylene Mass Flow Ratio | g/g | 0.048 |
| Second Reactor Feed Hydrogen/Ethylene Mass Flow Ratio | g/g | 4.0E−04 |
| Second Reactor Temperature | ° C. | 195 |
| Second Reactor Pressure | barg | 50 |
| Second Reactor Ethylene Conversion | % | 93.7 |
| Second Reactor Catalyst Type | Type | Catalyst component 2 |
| Second Reactor Co-Catalyst 1 Type | Type | Co-catalyst 1 |

TABLE 2A-continued

| | | Polyethylene Composition<br>Polyethylene Composition 6 |
|---|---|---|
| Second Reactor Co-Catalyst 2 Type | Type | Co-catalyst 2 |
| Second Reactor Catalyst Metal | Type | Zr |
| Second Reactor Co-Catalyst 1 to Catalyst Molar Ratio (B to Metal ratio) | mol/mol | 12.0 |
| Second Reactor Co-Catalyst 2 to Catalyst Molar Ratio (Al to Metal ratio) | mol/mol | >100.0 |
| Second Reactor Residence Time | min | 22.9 |
| Percentage of Total Ethylene Feed to First Reactor | wt % | 47.7 |

Example 2

Comparative Compositions A-J

Comparative Compositions A-C were prepared by methods described herein below. Comparative Compositions D-F are bimodal polyethylene compositions that are generally prepared using the catalyst system and processes provided for preparing the Inventive First Compositions in PCT Publication No. WO 2015/200743. Comparative Compositions G-J are commercially available polyethylene compositions. Table 3 identifies the commercially available polyethylene compositions of Comparative Compositions G-J.

TABLE 3

| Sample Comparative<br>Polyethylene Composition | Commercial Name<br>(Company of Manufacture) |
|---|---|
| G | ELITE 5400G (Dow Chemical Co.) |
| H | ELITE 5111G (Dow Chemical Co.) |
| I | EXCEED 1012 (ExxonMobil) |
| J | EXCEED 1018 (ExxonMobil) |

The preparation of Comparative Compositions A-C are described as follows. All raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

A two reactor system is used in a series configuration. Each continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to each reactor (solvent, monomer, comonomer, and hydrogen) is temperature controlled to maintain a single solution phase by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into the polymerization reactor through injection stingers. The primary catalyst component feed is computer controlled to maintain each reactor monomer conversion at the specified targets. The cocatalyst components are fed based on calculated specified molar ratios to the primary catalyst component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

In dual series reactor configuration the effluent from the first polymerization reactor (containing solvent, monomer, comonomer, hydrogen, catalyst components, and polymer) exits the first reactor loop and is added to the second reactor loop.

The second reactor effluent enters a zone where it is deactivated with the addition of and reaction with a suitable reagent (water). At this same reactor exit location other additives are added for polymer stabilization (typical antioxidants suitable for stabilization during extrusion and film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process.

The reactor stream feed data flows that correspond to the values in Table 4A used to produce the example are graphically described in FIG. 3. The data are presented such that the complexity of the solvent recycle system is accounted for and the reaction system can be treated more simply as a once through flow diagram. Table 1B shows the catalysts and co-catalysts shown in Table 4A.

TABLE 4A

|  |  | Polyethylene Composition | | |
| --- | --- | --- | --- | --- |
|  |  | Comparative Composition A | Comparative Composition B | Comparative Composition C |
| Reactor Configuration | Type | Dual Series | Dual Series | Dual Series |
| Comonomer type | Type | 1-octene | 1-octene | 1-octene |
| First Reactor Feed Solvent/ Ethylene Mass Flow Ratio | g/g | 5.5 | 5.1 | 5.3 |
| First Reactor Feed Comonomer/ Ethylene Mass Flow Ratio | g/g | 0.22 | 0.39 | 0.36 |
| First Reactor Feed Hydrogen/ Ethylene Mass Flow Ratio | g/g | 1.8E−04 | 1.0E−04 | 9.2E−05 |
| First Reactor Temperature | °C. | 160 | 160 | 160 |
| First Reactor Pressure | barg | 50 | 50 | 50 |
| First Reactor Ethylene Conversion | % | 90.9 | 88.4 | 90.8 |
| First Reactor Catalyst Type | Type | Catalyst component 3 | Catalyst component 1 | Catalyst component 1 |
| First Reactor Co-Catalyst 1 Type | Type | Co-catalyst 1 | Co-catalyst 1 | Co-catalyst 1 |
| First Reactor Co-Catalyst 2 Type | Type | Co-catalyst 2 | Co-catalyst 2 | Co-catalyst 2 |
| First Reactor Catalyst Metal | Type | Hf | Zr | Zr |
| First Reactor Co-Catalyst 1 to Catalyst Molar Ratio (B to Metal ratio) | Ratio | 12.1 | 1.2 | 1.2 |
| First Reactor Co-Catalyst 2 to Catalyst Molar Ratio (Al to Metal ratio) | Ratio | 50.1 | 15.0 | 9.6 |
| First Reactor Residence Time | min | 17.4 | 7.6 | 8.0 |
| Second Reactor Feed Solvent/ Ethylene Mass Flow Ratio | g/g | 2.2 | 2.5 | 2.5 |
| Second Reactor Feed Comonomer/ Ethylene Mass Flow Ratio | g/g | 0.030 | 0.105 | 0.084 |
| Second Reactor Feed Hydrogen/ Ethylene Mass Flow Ratio | g/g | 1.4E−04 | 2.5E−04 | 2.5E−04 |
| Second Reactor Temperature | °C. | 195 | 190 | 190 |
| Second Reactor Pressure | barg | 52 | 51 | 51 |
| Second Reactor Ethylene Conversion | % | 89.1 | 82.9 | 83.7 |
| Second Reactor Catalyst Type | Type | Catalyst component 4 | Catalyst component 2 | Catalyst component 2 |
| Second Reactor Co-Catalyst 1 Type | Type | None | Co-catalyst 1 | Co-catalyst 1 |
| Second Reactor Co-Catalyst 2 Type | Type | Co-catalyst 3 | Co-catalyst 2 | Co-catalyst 2 |
| Second Reactor Catalyst Metal | Type | Ti | Zr | Zr |
| Second Reactor Co-Catalyst 1 to Catalyst Molar Ratio (B to Metal ratio) | mol/mol | n/a | 1.2 | 1.2 |
| Second Reactor Co-Catalyst 2 to Catalyst Molar Ratio (Al to Metal ratio) | mol/mol | 4.0 | 3950 | 3520 |
| Second Reactor Residence Time | min | 7.7 | 5.8 | 5.8 |
| Percentage of Total Ethylene Feed to First Reactor | wt % | 27.9 | 60.7 | 58.1 |

Example 3

Analysis of Polyethylene Samples

Figure 2:
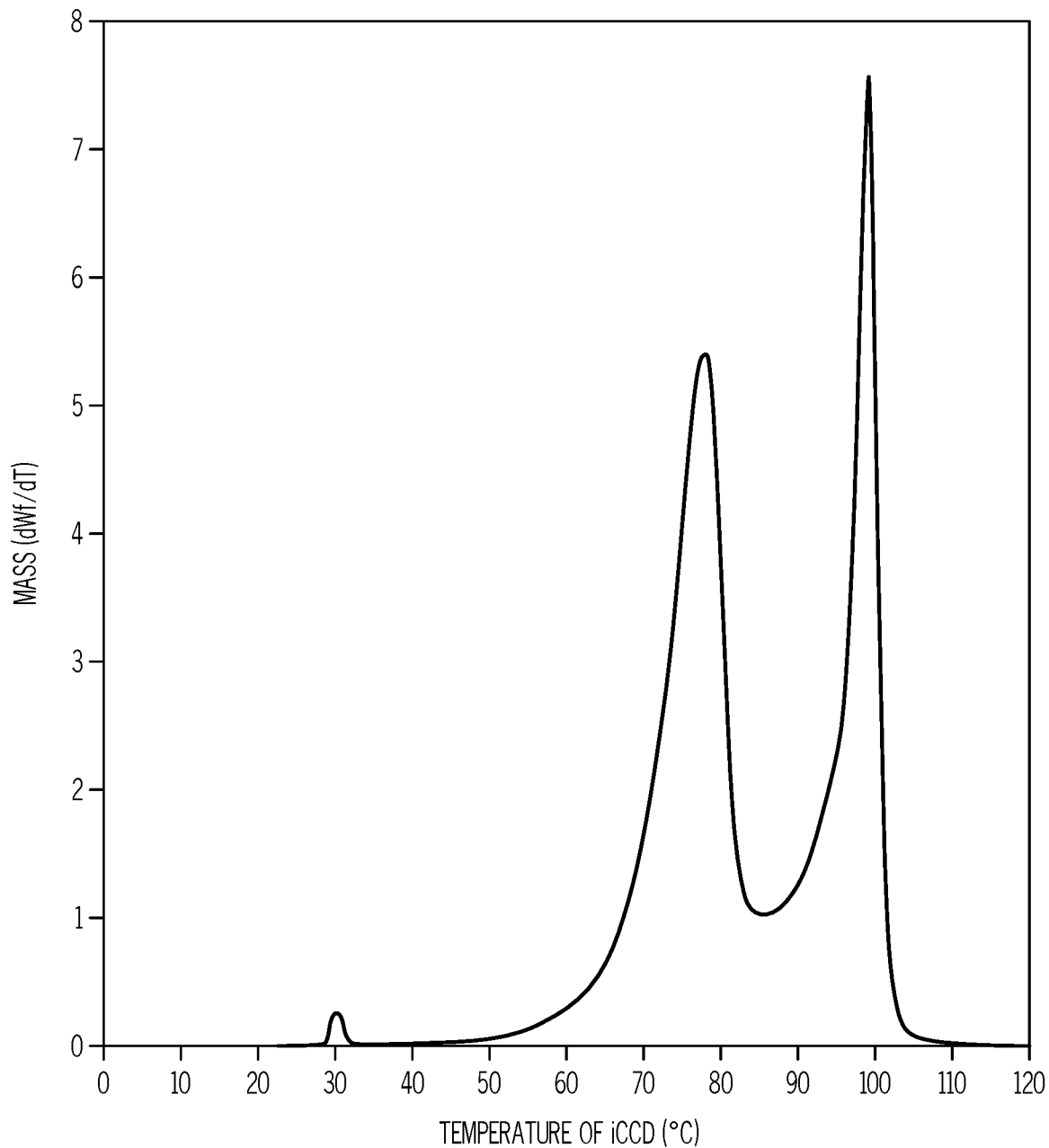
FIG. 2 graphically depicts the iCCD elution profile of a polyethylene composition of Example 1, according to one or more embodiments presently described.

Polyethylene Compositions 1-6 of Examples 1A and 1B, Comparative Polyethylene Compositions A-C of Example 2, as well as commercially available Comparative Polyethylene Samples D-J of Example 2 were analyzed by iCCD. The iCCD data of Polyethylene Composition 5 is provided in FIG. 2. Additional data generated from the iCCD testing of all samples is provided in Tables 5A and 5B. Specifically, Tables 5A and 5B includes analysis of the iCCD data, including the areas of the respective first and second polyethylene fractions (45-87° C. and 95-120° C.). Additional data is also provided for each example composition including overall density, Dart strength (method A), melt index, weight average molecular weight in the second PE fraction. These properties are based on monolayer blown films consisting completely of each polyethylene sample.

To conduct dart testing as well as other testing based on formed films, 2 mil blown films were formed with the polyethylene samples. Specifically, monolayer blown films are produced via an Egan Davis Standard extruder, equipped with a semi grooved barrel of ID 3.5 inch; 30/1 L/D ratio; a barrier screw; and an Alpine air ring. The extrusion line has an 8 inch die with internal bubble cooling. The extrusion line also has a film thickness gauge scanner. The film fabrication conditions were: film thickness maintained at 2 mil (0.001 in or 0.0254 mm); blow up ratio (BUR) 2.5; die gap 70 mil; and frost line height (FLH) 37 inch. The output rate was constant at 260 lbs/hr.

TABLE 5A

| PE Sample | Overall density (g/cm3) | Overall MI (g/10 min) | First PE fraction area (45-87 °C.) (%) | Second PE fraction area (95-120 °C.) (%) | First PE fraction area to Second PE fraction (area ratio) |
|---|---|---|---|---|---|
| 1 | 0.925 | 0.85 | 55.97% | 29.09% | 1.92 |
| 3 | 0.928 | 0.85 | 45.24% | 43.81% | 1.03 |
| 5 | 0.928 | 0.85 | 57.96% | 29.23% | 1.98 |
| 6 | 0.93 | 0.50 | 47.08% | 44.07% | 1.07 |
| A | 0.935 | 0.85 | 31.80% | 53.70% | 0.59 |
| B | 0.918 | 0.85 | 65.50% | 24.30% | 2.70 |
| C | 0.918 | 0.85 | 67.80% | 24.97% | 2.72 |
| D | 0.912 | 0.85 | 76.41% | 7.49% | 10.20 |
| E | 0.918 | 0.85 | 60.58% | 17.33% | 3.50 |
| F | 0.925 | 0.85 | 55.35% | 21.44% | 2.58 |
| G | 0.916 | 1.00 | 73.66% | 9.55% | 7.71 |
| H | 0.925 | 0.85 | 52.82% | 21.84% | 2.42 |
| I | 0.912 | 1.00 | 91.22% | 1.51% | 60.41 |
| J | 0.918 | 1.00 | 73.38% | 5.44% | 13.49 |

TABLE 5B

| PE Sample | Mw of second PE fraction (g/mol) | Overall polyethylene composition MWD | Dart A (g) | MD Tear (gf) | FWHM (°C.) | First PE fraction melt index (g/10 min) |
|---|---|---|---|---|---|---|
| 1 | 60444 | 3.5 | 1200 | 252 | 4 | 0.15 |
| 3 | 61805 | 3.5 | 1000 | 168 | 2.8 | 0.1 |
| 5 | 45684 | 4.6 | 1800 | 226 | 3.2 | 0.15 |
| 6 | 54882 | 4 | 2200 | 144 | 2.8 | 0.05 |
| A | 119731 | 3.9 | 300 | 103 | 4.2 | 0.1 |
| B | 65836 | 2.8 | 2200 | 303 | 3 | 0.28 |
| C | 72441 | 2.8 | 1800 | 324 | 2.8 | 0.3 |
| D | 96844 | 3.8 | 2000 | — | — | 0.2 |
| E | 107698 | 3.8 | 1700 | 292 | — | 0.2 |
| F | 95477 | 3.5 | 700 | 214 | 10.6 | 0.15 |
| G | 126779 | 3.9 | 1200 | — | — | — |
| H | 114384 | 3.7 | 400 | — | — | — |
| I | 73300 | 2.4 | 1800 | — | — | — |
| J | 91878 | 2.5 | 1200 | — | — | — |

The results show that no comparative example compositions display comparable dart strengths at overall densities of at least 0.924 g/cm³. For example, some comparative examples have high dart strength, but these samples have much lower density. Higher density comparative samples (e.g., 0.924 g/cm³ to 0.936 g/cm³) display much lower dart strength (e.g., less than 1000 grams).

Additionally, several compositions of Example 1 had Dow Rheology Indexes of less than 10, such as 3.5, 4.6, and 5.5.

Example 4

Evaluation of Utilizing the Disclosed Polyethylene Composition in the Core layer Example 4 compares four multilayer film samples prepared according to embodiments disclosed and described herein (Film 4-1, Film 4-2, Film 4-3, and Film 4-4), with comparative multilayer films samples (Comparative 4-A, Comparative 4-B, Comparative 4-C, Comparative 4-D, Comparative 4-E, Comparative 4-F, Comparative 4-G, and Comparative 4-H). For all samples produced and tested in Example 4, the multilayer films had three layers including two outer layers and one core layer. The material used in the outer layer was the same for each outer layer and remained constant throughout each sample. To observe the effect of utilizing various materials in the core layer, the samples tested in Example 4 each included a core layer comprised of one material, but the materials were different for the various samples. In Example 4, samples were produced having both an overall thickness of 55 μm and an overall thickness of 45 μm, to observe the down-gauging effects.

Film 4-1, Film 4-2, Film 4-3, and Film 4-4 are examples of multilayer films according to some embodiments of the present disclosure. As shown subsequently in Table 6, Polyethylene Composition 1 (PE Comp. 1), prepared in accordance with Example 1A, was utilized in Film 4-1 and Film 4-3; Polyethylene Composition 2 (PE Comp. 2), prepared in accordance with Example 1A, was utilized in Film 4-2 and Film 4-4; and Film 4-1, Film 4-2, Film 4-3, and Film 4-4 each included DOWLEX™ GM 8051 polyethylene (melt index: 0.9 g/10 min at 2.16 kg and 190° C., density: 0.921 g/cm³, commercially-available from The Dow Chemical Company).

Also as shown subsequently in Table 6, Comparative 4-A, Comparative 4-B, Comparative 4-C, Comparative 4-D, Comparative 4-E, Comparative 4-F, Comparative 4-G, and Comparative 4-H included two or more DOWLEX™ GM 8051 polyethylene (melt index: 0.9 g/10 min at 2.16 kg and 190° C., density: 0.921 g/cm³, commercially-available from The Dow Chemical Company), DOWLEX™ 2049 polyethylene (melt index: 1.0 g/10 min at 2.16 kg and 190° C., density: 0.926 g/cm³, commercially-available from The Dow Chemical Company), 6D20 polypropylene resin (melt index: 1.9 g/10 min at 2.16 kg and 230° C., density: 0.900 g/cm³, commercially-available from Braskem "rPP"), and two bimodal polyethylene compositions (melt index: 0.85 g/10 min at 2.16 kg and 190° C., density: 0.918 g/cm³, "Bimodal PE1") and (melt index: 0.85 g/10 min at 2.16 kg and 190° C., density: 0.926 g/cm³, "Bimodal PE2")). Bimodal PE1 and Bimodal PE2 are polyethylene compositions that are generally prepared using the catalyst system and processes provided for preparing the Inventive First Compositions in PCT Publication No. WO 2015/200743.

To produce the sample films of Example 4, the materials of Table 6 were formed into blown films on a 5-layer extrusion line, equipped with a blow up ratio (BUR) of 2.5, a die temperature of 230° C.; a die gap of 1.8 mm, a melt temperature 225° C., and a rate of 12.5 kg/hr.

The structure and layer distribution of the multilayer films of Example 4 are provided as follows in Table 6.

TABLE 6

Structure and Layer Distribution of Multilayer Films of Example 4.

| Sample | Structure Second layer/first layer/third layer | Overall Thickness (μm) | Layer Distribuition (μm) |
|---|---|---|---|
| Comp. 4-A | DOWLEX ™ GM 8051/Bimodal PE1/DOWLEX ™ GM 8051 | 55 | 11/33/11 |
| Comp. 4-B | DOWLEX ™ GM 8051/DOWLEX ™ 2049/DOWLEX ™ GM 8051 | 55 | 11/33/11 |
| Comp. 4-C | DOWLEX ™ GM 8051/Bimodal PE2/DOWLEX ™ GM 8051 | 55 | 11/33/11 |
| Comp. 4-D | DOWLEX ™ GM 8051/rPP/DOWLEX ™ GM 8051 | 55 | 11/33/11 |
| Comp. 4-E | DOWLEX ™ GM 8051/Bimodal PE1/DOWLEX ™ GM 8051 | 45 | 9/27/9 |
| Comp. 4-F | DOWLEX ™ GM 8051/DOWLEX ™ 2049/DOWLEX ™ GM 8051 | 45 | 9/27/9 |
| Comp. 4-G | DOWLEX ™ GM 8051/Bimodal PE2/DOWLEX ™ GM 8051 | 45 | 9/27/9 |
| Comp. 4-H | DOWLEX ™ GM 8051/rPP/DOWLEX ™ GM 8051 | 45 | 9/27/9 |
| Inv. Film 4-1 | DOWLEX ™ GM 8051/PE Comp. 1/DOWLEX ™ GM 8051 | 55 | 11/33/11 |
| Inv. Film 4-2 | DOWLEX ™ GM 8051/PE Comp. 2/DOWLEX ™ GM 8051 | 55 | 11/33/11 |
| Inv. Film 4-3 | DOWLEX ™ GM 8051/PE Comp. 1/DOWLEX ™ GM 8051 | 45 | 9/27/9 |
| Inv. Film 4-4 | DOWLEX ™ GM 8051/PE Comp. 2/DOWLEX ™ GM 8051 | 45 | 9/27/9 |

Certain properties of the multilayer films of Example 4 were measured according to the test methods disclosed herein, and the properties are provided in Table 7.

TABLE 7

Properties of Multilayer Films of Example 4.

| Sample | Structure Second layer/first layer/third layer | Dart B (g) | Sec Mod MD 2% (Mpa) |
|---|---|---|---|
| Comp. 4-A | DOWLEX ™ GM 8051/Bimodal PE1/DOWLEX ™ GM 8051 | 691 | 175 |
| Comp. 4-B | DOWLEX ™ GM 8051/DOWLEX ™ 2049/DOWLEX ™ GM 8051 | <300 | 212 |
| Comp. 4-C | DOWLEX ™ GM 8051/Bimodal PE2/DOWLEX ™ GM 8051 | 430 | 222 |
| Comp. 4-D | DOWLEX ™ GM 8051/rPP/DOWLEX ™ GM 8051 | <300 | 448 |
| Comp. 4-E | DOWLEX ™ GM 8051/Bimodal PE1/DOWLEX ™ GM 8051 | 646 | 194 |
| Comp. 4-F | DOWLEX ™ GM 8051/DOWLEX ™ 2049/DOWLEX ™ GM 8051 | <300 | 215 |
| Comp. 4-G | DOWLEX ™ GM 8051/Bimodal PE2/DOWLEX ™ GM 8051 | 345 | 222 |
| Comp. 4-H | DOWLEX ™ GM 8051/rPP/DOWLEX ™ GM 8051 | <300 | 493 |
| Inv. Film 4-1 | DOWLEX ™ GM 8051/PE Comp. 1/DOWLEX ™ GM 8051 | 741 | 212 |
| Inv. Film 4-2 | DOWLEX ™ GM 8051/PE Comp. 2/DOWLEX ™ GM 8051 | 1137 | 261 |
| Inv. Film 4-3 | DOWLEX ™ GM 8051/PE Comp. 1/DOWLEX ™ GM 8051 | 588 | 209 |
| Inv. Film 4-4 | DOWLEX ™ GM 8051/PE Comp. 2/DOWLEX ™ GM 8051 | 975 | 269 |

As shown in Table 7, for the films having an overall thickness of 55 μm, Comparative 4-A exhibited the lowest secant modulus of all samples tested. Although Comparative 4-D showed a secant modulus of 448 MPa, it exhibited a Dart B of less than 300 g. Comparative 4-B, Comparative 4-C, Film 4-1 showed relatively comparable secant modulus properties. However, Film 4-1 exhibited higher dart B than Comparative 4-B and Comparative 4-C. Film 4-2 exhibited the highest dart B and secant modulus values of all samples tested in Example 4 having an overall thickness of 55 μm.

As shown in Table 7, for the films having an overall thickness of 45 μm, Comparatives 4-E exhibited the second lowest secant modulus of all samples tested. Although Comparative 4-H showed a secant modulus of 493 MPa, it exhibited a Dart B of less than 300 g. Comparative 4-F, Comparative 4-G, and Film 4-3 showed relatively comparable secant modulus properties. However, Film 4-3 exhibited higher dart B than Comparative 4-F and Comparative 4-G. Film 4-4 exhibited the highest dart B of all samples tested in Example 4 having an overall thickness of 45 microns and the highest secant modulus values of all samples having a polyethylene core and an overall thickness of 45 microns.

Therefore, the results of Table 7 show that embodiments of the present disclosure, which include a core layer incorporating the polyethylene composition described herein, may provide unexpected superior dart impact resistance when compared to multilayer films that include core layers comprising other polyolefins. Here, a balance of stiffness (2% Sec Modulus) and dart impact resistance may be observed for the multilayer films, which was not achieved by the comparative multilayer films. This balance of stiffness and toughness may be advantageous in various packaging applications, especially when lesser gauges are used (down-gauging).

Example 5

Evaluation of Utilizing the Disclosed Polyethylene Composition in the Core Layer and Outer Layers Example 5 compares three multilayer film samples prepared according to some presently-described embodiments (Film 5-1, Film 5-2, and Film 5-3) with comparative multilayer films samples (Comparative 5-A, Comparative 5-B, Comparative 5-C, Comparative 5-D). For all samples produced and tested in Example 5, the multilayer films had three layers including two outer layers and one core layer. In the outer layers of all samples tested in Example 5, the LDPE material used and the weight percent of the LDPE material in the outer layer remained constant. In the core layers of all samples tested in Example 5, the masterbatch material, the amount of masterbatch material, and the HDPE material used in the core layer remained constant. In Example 5, samples were produced having an overall thickness of 4.0 mils (101.6 $_1$.1,m) and an overall thickness of 4.23 mils (107.4 μm), to observe the effect of down-gauging on certain properties. To observe the effect of utilizing the disclosed polyethylene compositions in the core layer and outer layers, the balance of the materials in the outer layer and the a core layers varied for the samples of Example 5.

Film 5-1, Film 5-2, and Film 5-3 are examples of multi-layer films according to some presently-described embodiments. As shown subsequently in Table 8, Polyethylene Composition 4 (PE Comp. 4), prepared in accordance with Example 1A, was utilized in Film 5-1; Polyethylene Composition 2, prepared in accordance with Example 1A, was utilized in Film 5-2 and Film 5-3; AGILITY™ 1200 polyethylene (melt index: 0.25 g/10 min at 2.16 kg and 190° C., density: 0.919 g/cm$^3$, commercially-available from The Dow Chemical Company) was utilized in Film 5-1, Film 5-2, and Film 5-3; DMDH 6400 polyethylene (melt index: 0.80 g/10 min at 2.16 kg and 190° C., density: 0.961 g/cm$^3$, commercially-available from The Dow Chemical Company), was utilized in Film 5-1, Film 5-2, and Film 5-3; and masterbatch TiO$_2$ (commercially-available from Ampacet Corporation) was utilized in Film 5-1, Film 5-2, and Film 5-3.

Also as shown subsequently in Table 8, Comparatives 5A-5D were formed from EXCEED™ 1018 polyethylene (melt index: 1.0 g/10 min at 2.16 kg and 190° C., density: 0.918 g/cm$^3$, commercially-available from ExxonMobil), AGILITY™ 1200 polyethylene (melt index: 0.25 g/10 min at 2.16 kg and 190° C., density: 0.919 g/cm$^3$, commercially-available from The Dow Chemical Company), DMDH 6400 polyethylene (melt index: 0.80 g/10 min at 2.16 kg and 190° C., density: 0.961 g/cm$^3$, commercially-available from The Dow Chemical Company), Bimodal PE1, Bimodal PE2, and masterbatch TiO2 (commercially-available from Ampacet Corporation).

To produce the sample films of Example 5, the materials of Table 8 were formed into films on an Alpine 7-layer blown film line. The extruder size was 2.5 inches, the die diameter was 7.87 inches, the die gap was 78.7 mils, the blow up ratio (BUR) was 1.75, the melt temperature was 458° F. to 472° F., the output rate was 250 lbs/hr, the line speed was 56 ft./min (3-layer coex), and the frost line height (FLH) was 36 inches.

The structure and layer distribution of the multilayer films of Example 5 are provided as follows in Table 8.

TABLE 8

Structure and Layer Distribution of Films and Comparatives of Example 5.

| Sample; Overall Thickness | Outer Layer A 25 wt. % | Core Layer 50 wt. % | Outer Layer B 25 wt. % |
|---|---|---|---|
| Comp. 5-A 4.0 mils | EXCEED ™ 1018 (95 wt. %) AGILITY ™ 1200 (5 wt. %) | EXCEED ™ 1018 (37 wt. %) DMDH 6400 (56 wt. %) TiO$_2$ (7 wt. %) | EXCEED ™ 1018 (95 wt. %) AGILITY ™ 1200 (5 wt. %) |
| Comp. 5-B 4.0 mils | Bimodal PE1 (95 wt. %) AGILITY ™ 1200 (5 wt. %) | Bimodal PE1 (37 wt. %) DMDH 6400 (56 wt. %) TiO$_2$ (7 wt. %) | Bimodal PE1 (95 wt. %) AGILITY ™ 1200 (5 wt. %) |
| Comp. 5-C 4.0 mils | Bimodal PE2 (95 wt. %) AGILITY ™ 1200 (5 wt. %) | Bimodal PE2 (63 wt. %) DMDH 6400 (30 wt. %) TiO$_2$ (7 wt. %) | Bimodal PE2 (95 wt. %) AGILITY ™ 1200 (5 wt. %) |
| Comp. 5-D 4.23 mils | EXCEED ™ 1018 (95 wt. %) AGILITY ™ 1200 (5 wt. %) | EXCEED ™ 1018 (37 wt. %) DMDH 6400 (56 wt. %) TiO$_2$ (7 wt. %) | EXCEED ™ 1018 (95 wt. %) AGILITY ™ 1200 (5 wt. %) |
| Inv. Film 5-1 4.0 mils | PE Comp. 4 (95 wt. %) AGILITY ™ 1200 (5 wt. %) | PE Comp. 4 (63 wt. %) DMDH 6400 (30 wt. %) TiO$_2$ (7 wt. %) | PE Comp. 4 (95 wt. %) AGILITY ™ 1200 (5 wt. %) |
| Inv. Film 5-2 4.0 mils | PE Comp. 2 (95 wt. %) AGILITY ™ 1200 (5 wt. %) | PE Comp. 2 (65 wt. %) DMDH 6400 (28 wt. %) TiO$_2$ (7 wt. %) | PE Comp. 2 (95 wt. %) AGILITY ™ 1200 (5 wt. %) |
| Inv. Film 5-3 4.0 mils | PE Comp. 2 (100 wt. %) | PE Comp. 2 (65 wt. %) DMDH 6400 (28 wt. %) TiO$_2$ (7 wt. %) | PE Comp. 2 (95 wt. %) AGILITY ™ 1200 (5 wt. %) |

The properties of the multilayer films of Example 5 were measured according to the test methods disclosed herein, and the properties are provided in Table 9.

TABLE 9

Properties of Multilayer Films of Example 5.

| Sample | Dart B (g) | Tensile Creep - CD (% strain at 1.4 kg/50° C./5 hr) | Tear - MD (gf) |
|---|---|---|---|
| Comp. 5-A | 522 | 11.5 | 632 |
| Comp. 5-B | 570 | 29.2 | 643 |
| Comp. 5-C | 540 | 20.5 | 858 |
| Comp. 5-D | 616 | 39.8 | 1111 |
| Film 5-1 | 747 | 9.2 | 773 |
| Film 5-2 | 702 | 10.5 | 470 |
| Film 5-3 | 1014 | 14.0 | 713 |

As shown in Table 9, Film 5-3 exhibited the highest dart, followed by Film 5-1 and Film 5-2. Additionally, Film 5-1, followed by Film 5-2, Comparative 5-A, and Film 5-3 exhibited the lowest tensile creep properties. Therefore, the results of Table 9 show that such presently-described embodiments, which include a core layer incorporating the polyethylene composition described herein, may provide unexpected superior dart impact resistance and tensile creep properties when compared to multilayer films that include core layers comprising other polyolefins.

Example 6

Evaluation of Utilizing the Disclosed Polyethylene Composition in the Core Layer to Reduce or Eliminate the Need of Polyamide Example 6 compares two multilayer film samples prepared according to some presently-described embodiments (Film 6-1 and Film 6-2) with comparative multilayer films samples (Comparative 6-A, Comparative 6-B, Comparative 6-C, and Comparative 6-D). For all samples produced and tested in Example 6, the multilayer films had three layers including two outer layers and one core layer. In the outer layers of all samples tested in Example 6, the LDPE material used, the weight percent of the LDPE material in the outer layers, the HDPE material used, and the weight percent of the HDPE material in the outer layers remained constant. To observe the effect of utilizing the disclosed polyethylene compositions in the core layer and outer layers, the ratio of polyethylene to HDPE in the core layer was varied in an attempt to maintain similar film density across the samples.

To produce the films of Example 6, materials in the amounts listed in Tables 10 and 11 were formed into blown films on a 7 layer Alpine co-ex blown line. The parameters of the blown film line included a 9.84 mil die, a 78.7 mil die gap, a BUR of 2.5:1, a rate of 350 lbs/hr, a die temperature of approximately 450° F., a melt temperate of from 439° F. to 497° F. (depending on the material being extruded), and an actual rate of 11.3 lbs/hr/in.

As shown in Table 10, a reference structure including polyamide (nylon) was prodced. The materials used to produce Comparative 6-A included Bimodal PE1, ELITE™ 5960 polyethylene (melt index: 0.85 g/10 min at 2.16 kg and 190° C., density: 0.962 g/cm$^3$, commercially-available from The Dow Chemical Company), and DOW LDPE 132I (melt index: 0.25 g/10 min at 2.16 kg and 190° C., density: 0.921 g/cm$^3$, commercially-available from The Dow Chemical Company), Bynel 41E710 anhydride-modified LLDPE resin (melt index: 1.2 g/10 min at 2.16 kg and 190° C., density: 0.862 g/cm$^3$, commercially-available from The Dow Chemical Company), and Ultramid C4OL polyamide (commercially-available from BASF).

The structure and layer distribution of Comparative 6-A is provided in Table 10.

TABLE 10

Structure and Layer Distribution of Comparative 6-A including Polyamide.

| | Structure Thickness: 76.1 μm | | | | |
|---|---|---|---|---|---|
| Sample | Outer Layer A Thickness: 27.4 μm | Tie Layer Thickness: 4.6 μm | Core Layer Thickness: 6 μm | Tie Layer Thickness: 4.6 μm | Outer Layer B Thickness: 33.5 μm |
| Comp. 6-A | Bimodal PE1 (50 wt. %) LDPE 132I (35 wt. %) ELITE ™ 5960 (15 wt. %) | Bimodal PE1 (85 wt. %) Bynel 41E710 (15 wt. %) | Ultramid C40L | Bimodal PE1 (85 wt. %) Bynel 41E710 (15 wt. %) | Bimodal PE1 (65 wt. %) LDPE 132I (35 wt. %) |

Film 6-1 and Film 6-2 are examples of multilayer films according to some presently-described embodiments. As shown subsequently in Table 11, Polyethylene Composition 2 (PE Comp. 2), prepared in accordance with Example 1A, was utilized in Film 6-1; Polyethylene Composition 3 (PE Comp. 3), prepared in accordance with Example 1A, was utilized in Film 6-2. Film 6-1 and 6-2 also included Bimodal PE1, ELITETM 5960 polyethylene (melt index: 0.85 g/10 min at 2.16 kg and 190° C., density: 0.962 g/cm$^3$, commercially-available from The Dow Chemical Company), DOW LDPE 1321 (melt index: 0.25 g/10 min at 2.16 kg and 190° C., density: 0.921 g/cm$^3$, commercially-available from The Dow Chemical Company), and two a polyethylene composition (melt index: 0.85 g/10 min at 2.16 kg and 190° C., density: 0.925 g/cm$^3$, "Bimodal PE3"). Bimodal PE3 is a polyethylene compositions that is generally prepared using the catalyst system and processes provided for preparing the First Compositions in PCT Publication No. WO 2015/200743.

Also as shown subsequently in Table 11, the following materials were utilized in Comparative 6-B, Comparative 6-C, and Comparative 6-D: Bimodal PE1 (melt index: 0.85 g/10 min at 2.16 kg and 190° C., density: 0.918 g/cm$^3$, commercially-available from The Dow Chemical Company), ELITETM 5960 polyethylene (melt index: 0.85 g/10 min at 2.16 kg and 190° C., density: 0.962 g/cm$^3$, commercially-available from The Dow Chemical Company), DOW LDPE 1321 (melt index: 0.25 g/10 min at 2.16 kg and 190° C., density: 0.921 g/cm$^3$, commercially-available from The Dow Chemical Company), and Comparative Composition C ("Comp. C of Ex. 2") of Example 2.

The structures of the films produced in Example 6 are provided below:

TABLE 11

Structure and Layer Distribution of Comparatives and Films of Example 6 not including Polyamide.

| | Structure Thickness: 76.1 μm | | |
|---|---|---|---|
| Sample | Outer Layer A Thickness: 22.8 μm | Core Layer Thickness: 30.5 μm | Outer Layer B Thickness: 22.8 μm |
| Comp. 6-B | Bimodal PE1 (50 wt. %) LDPE 132I (35 wt. %) ELITE ™ 5960 (15 wt. %) | Bimodal PE1 (48 wt. %) ELITE ™ 5960 (52 wt. %) | Bimodal PE1 (65 wt. %) LDPE 132I (35 wt. %) |
| Comp. 6-C | Comp. C of Ex. 2 (50 wt. %) LDPE 1321 (35 wt. %) ELITE ™ 5960 (15 wt. %) | Comp. C of Ex. 2 (48 wt. %) ELITE ™ 5960 (52 wt. %) | Comp. C of Ex. 2 (65 wt. %) LDPE 132I (35 wt. %) |
| Comp. 6-D | Bimodal PE3 (50 wt. %) LDPE 132I (35 wt. %) ELITE ™ 5960 (15 wt. %) | Bimodal PE3 (74 wt. %) ELITE ™ 5960 (26 wt. %) | Bimodal PE3 (65 wt. %) LDPE 132I (35 wt. %) |
| Inv. Film 6-1 | PE Comp. 2 (50 wt. %) LDPE 132I (35 wt. %) ELITE ™ 5960 (15 wt. %) | PE Comp. 2 (88 wt. %) ELITE ™ 5960 (12 wt. %) | PE Comp. 2 (65 wt. %) LDPE 132I (35 wt. %) |
| Inv. Film 6-2 | PE Comp. 3 (50 wt. %) LDPE 132I (35 wt. %) ELITE ™ 5960 (15 wt. %) | PE Comp. 3 (88 wt. %) ELITE ™ 5960 (12 wt. %) | PE Comp. 3 (65 wt. %) LDPE 132I (35 wt. %) |

The properties of the multilayer films of Example 6 were measured according to the test methods disclosed herein, and the properties are provided in Table 12.

TABLE 12

Properties of Multilayer Films of Example 6.

| Sample | Dart (g) | Modulus (MD, psi) |
|---|---|---|
| Comp. 6-A | 432 | 36183.63 |
| Comp. 6-B | 338 | 46932.60 |
| Comp. 6-C | 267 | 46093.99 |
| Comp. 6-D | 324 | 50972.51 |
| Inv. Film 6-1 | 446 | 51184.92 |
| Inv. Film 6-2 | 396 | 52705.08 |

As shown in Table 12, Films 6-1 exhibited the highest dart, followed by Comparative 6-A and Film 6-2. Additionally, Film 6-2, followed by Film 6-1, exhibited the highest modulus, while Comparative 6-A exhibited the lowest modulus. Therefore, the results of Table 12 show that such presently-described embodiments, which include a core layer incorporating the polyethylene composition described herein and no polyimide core layer, may provide an unexpected balance of superior dart impact resistance and tensile creep properties when compared to multilayer films that include core layers comprising other polyolefins or polyamides.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A multilayer film comprising:
a first layer comprising:
a polyethylene composition comprising:
(a) a first polyethylene fraction having a single peak in a temperature range of 45° C. to 87° C. in an elution profile via improved comonomer composition distribution (iCCD) analysis method, wherein a first polyethylene fraction area is an area in the elution profile beneath the single peak of the first polyethylene fraction between 45° C. and 87° C.; and
(b) a second polyethylene fraction having a single peak in a temperature range of 95° C. to 120° C. in the elution profile via iCCD analysis method and wherein a second polyethylene fraction area is an area in the elution profile beneath the single peak of the second polyethylene fraction between 95° C and 120° C.;
wherein the polyethylene composition has a density of 0.924 g/cm$^3$ to 0.936 g/cm$^3$ and a melt index (I$_2$) of 0.25 g/10 minutes to 2.0 g/10 minutes at a load of 2.16 kg and a temperature of 190° C., wherein the first polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.;
a second layer comprising a first polyolefin; and
a third layer comprising a second polyolefin;
wherein the first layer is positioned between the second layer and the third layer; and
wherein the first polyolefin and the second polyolefin are the same or different.

2. The multilayer film of claim 1, wherein the first polyolefin composition, the second polyolefin composition, or both, comprise a polyethylene having a density of from 0.870 g/cm$^3$ to 0.970 g/cm$^3$.

3. The multilayer film of claim 1, wherein:
the first layer is in direct contact with the second layer and the third layer; and
the second layer and the third layer are the outermost layers of the multilayer film.

4. The multilayer film of claim 1, wherein the polyethylene composition having a density of 0.924 cm$^3$ to 0.936 g/cm$^3$ has a zero shear viscosity ratio of less than 3.0 and a molecular weight distribution, expressed as the ratio of the weight average molecular weight to number average molecular weight ($M_w/M_n$), in the range of from 2.5 to 8.0.

5. The multilayer film of claim 1, wherein the multilayer film has a thickness of less than 500 micrometers (μm).

6. The multilayer film of claim 1, wherein the first layer further comprises a polyethylene having a density of greater than 0.940 g/cm$^3$, when measured according to ASTM 742.

7. The multilayer film of claim 1,
wherein the first layer comprises from 10 wt. % to 80 wt. % of the total weight of the multilayer film;
wherein the second layer comprises a first linear low density polyethylene having a density of from 0.910 to 0.936 g/cm$^3$; and
wherein the third layer comprises a second linear low density polyethylene having a density of from 0.910 to 0.936 g/cm$^3$; and
wherein the first linear low density polyethylene and the second linear low density polyethylene are the same or different.

8. The multilayer film of claim 7, wherein the multilayer film has a dart drop impact of at least 400 grams when measured according to ASTM D1709 Method B.

9. The multilayer film of claim 7, wherein the multilayer film has an average secant modulus in a machine direction from 29,000 psi to 37,000 psi, wherein the average secant modulus is measured in accordance with ASTM D882.

10. A multilayer film comprising:
a first layer comprising:
a high-density polyethylene composition having a density of from 0.940 g/cm$^3$ to 0.970 g/cm$^3$, when measured according to ASTM 742; and
a polyethylene composition comprising:
(a) a first polyethylene fraction having a single peak in a temperature range of 45° C. to 87° C. in an elution profile via improved comonomer composition distribution (iCCD) analysis method, wherein a first polyethylene fraction area is an area in the elution profile beneath the single peak of the first polyethylene fraction between 45° C. and 87° C.; and
(b) a second polyethylene fraction having a single peak in a temperature range of 95° C. to 120° C. in the elution profile via iCCD analysis method and wherein a second polyethylene fraction area is an area in the elution profile beneath the single peak of the second polyethylene fraction between 95° C. and 120° C.;
wherein the polyethylene composition has a density of 0.924 g/cm$^3$ to 0.936 g/cm$^3$ and a melt index ($I_2$) of 0.25 g/10 minutes to 2.0 g/10 minutes at a load of 2.16 kg and a temperature of 190° C., wherein the first polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.;
a second layer comprising at least 50 wt. % of a first linear low density polyethylene based on the total weight of the second layer, the first linear low density polyethylene having a density of from 0.910 g/cm$^3$ to 0.936 g/cm$^3$; and
a third layer comprising at least 50 wt. % of a second linear low density polyethylene based on the total weight of the second layer, the second linear low density polyethylene having a density of from 0.910 g/cm$^3$ to 0.936 g/cm$^3$;
wherein the first layer is positioned between the second layer and the third layer; and
wherein the first linear low density polyethylene and the second linear low density polyethylene are the same or different.

11. The multilayer film of claim 10, wherein the multilayer film tensile creep in a cross direction of less than 50% at 1.4 kg/50° C./5 hr when measured in accordance with ASTM 2990.

12. The multilayer film of claim 10, wherein the multilayer film has a dart drop impact of at least 600 grams when measured according to ASTM D1709 Method B.

13. A multilayer film comprising:
a first layer comprising:
a first polyethylene having a density of from 0.940 g/cm$^3$ to 0.970 g/cm$^3$; and
a first polyethylene composition having a density of 0.924 g/cm$^3$ to 0.936 g/cm$^3$;
a second layer comprising:
a second polyethylene having a density of 0.940 g/cm$^3$ to 0.970 g/cm$^3$;
a first low density polyethylene having a density of 0.916 g/cm$^3$ to 0.935 g/cm$^3$; and
a second polyethylene composition having a density of 0.924 g/cm$^3$ to 0.936 g/cm$^3$; and
a third layer comprising:
a second low density polyethylene having a density of 0.916 g/cm$^3$ to 0.935 g/cm$^3$; and
a third polyethylene composition having a density of 0.924 g/cm$^3$ to 0.936 g/cm$^3$; and
wherein:
the first layer is positioned between the second layer and the third layer;
the first polyethylene and the second polyethylene are the same or different;
the first low density polyethylene and the second low density polyethylene are the same or different;
the first polyethylene composition, second polyethylene composition, and third polyethylene composition are the same or different compositions and each comprise:
(a) a first polyethylene fraction having a single peak in a temperature range of 45° C. to 87° C. in an elution profile via improved comonomer composition distribution (iCCD) analysis method, wherein a first polyethylene fraction area is an area in the elution profile beneath the single peak of the first polyethylene fraction between 45° C. and 87° C.; and
(b) a second polyethylene fraction having a single peak in a temperature range of 95° C. to 120° C. in the elution profile via iCCD analysis method and wherein a second polyethylene fraction area is an area in the elution profile beneath the single peak of the second polyethylene fraction between 95° C. and 120° C.;
wherein the polyethylene composition has a density of 0.924 g/cm$^3$ to 0.936 g/cm$^3$ and a melt index ($I_2$) of 0.25 g/10 minutes to 2.0 g/10 minutes at a load of 2.16 kg and a temperature of 190° C., wherein the first polyethylene fraction area comprises at least 40% of the total area of the elution profile, wherein a ratio of the first polyethylene fraction area to the second polyethylene fraction area is 075 to 2.5, and wherein the width of the single peak of the second polyethylene fraction at 50 percent peak height is less than 5.0° C.

14. The multilayer film of claim 13, wherein the multilayer film has a dart drop impact of at least 350 grams when measured according to ASTM D1709 Method B.

15. The multi layer film of claim 13, wherein the multilayer film has an average secant modulus in a machine direction greater than 50,000 psi, wherein the average secant modulus is measured in accordance with ASTM D882.

* * * * *